United States Patent [19]

Hogg

[11] Patent Number: 4,639,962
[45] Date of Patent: Feb. 3, 1987

[54] APPARATUS FOR COMB HONEY

[76] Inventor: John A. Hogg, 2225 S. 36th St., Galesburg, Mich. 49053

[21] Appl. No.: 687,314

[22] Filed: Dec. 28, 1984

Related U.S. Application Data

[63] Continuation-in-part of Ser. No. 581,762, Feb. 21, 1984, abandoned.

[51] Int. Cl.$^4$ ............................................. A01K 47/02
[52] U.S. Cl. ............................................. 6/2 R; 6/10
[58] Field of Search ............................. 6/2 R, 10, 11

[56] References Cited

U.S. PATENT DOCUMENTS

| | | | |
|---|---|---|---|
| 31,658 | 3/1861 | Daniels et al. | 6/2 R |
| 86,913 | 2/1869 | Flansburgh | 6/2 R |
| 154,874 | 9/1874 | Leedy | 6/10 |
| 243,674 | 6/1881 | Forncrook | 6/2 R |
| 302,854 | 7/1884 | Livingston | 6/2 R |
| 337,143 | 3/1886 | Foster | 6/2 R |
| 338,647 | 3/1886 | Shuck | 6/2 R |
| 427,993 | 5/1890 | Hopkins | 6/2 R |
| 452,366 | 5/1891 | Ferguson | 6/2 R |
| 529,116 | 11/1894 | Ferguson | 6/2 R |
| 804,736 | 11/1905 | Kregel | 6/2 R |
| 846,396 | 3/1907 | Calvert et al. | 6/10 |
| 869,917 | 11/1907 | Lewis | 6/10 |
| 929,616 | 7/1909 | Maxwell et al. | 6/2 R |
| 993,551 | 5/1911 | Rogers | 6/2 R |
| 995,070 | 6/1911 | Linblum | 6/2 R |
| 1,042,907 | 10/1912 | Gebhart | 6/2 R |
| 1,637,002 | 7/1927 | Koepp | 6/10 |
| 2,023,959 | 12/1935 | Knox | 6/10 |
| 2,604,643 | 7/1952 | Hamilton | 6/10 |
| 3,088,135 | 5/1963 | Covington | 6/10 |
| 3,187,353 | 6/1965 | Ackerman | 6/10 |
| 4,195,379 | 4/1980 | Krasnik | 6/11 |
| 4,329,749 | 5/1982 | Hogg | 6/2 R |
| 4,435,865 | 4/1984 | Hogg | 6/2 R |

FOREIGN PATENT DOCUMENTS

| | | |
|---|---|---|
| 2028914 | 12/1971 | Fed. Rep. of Germany . |
| 2716987 | 11/1977 | Fed. Rep. of Germany . |
| 958111 | 3/1950 | France ........................... 6/11 |
| 2023395 | 1/1980 | United Kingdom ........... 6/2 R |

OTHER PUBLICATIONS

John A. Hogg, "A New Comb Honey Concept the Half Comb Section", *American Bee Journal*, May 1980, pp. C357–361.

The A. I. Root Co., Medina, Ohio, in "1979 Bee Supplies" Catalog, p. 12.

*Primary Examiner*—Robert P. Swiatek
*Attorney, Agent, or Firm*—Flynn, Thiel, Boutell & Tanis

[57] ABSTRACT

Apparatus for producing comb honey in a hive and for marketing thereof. Cassettes each include a boxlike base and a removable cover. The cassettes are stackable in side-by-side horizontal columns in a super. The side-by-side cassettes are constructed so that bees or structure in one cassette can influence production of comb honey in the adjacent cassette, to induce filling with honey to a uniform depth across the full width of each cassette.

21 Claims, 23 Drawing Figures

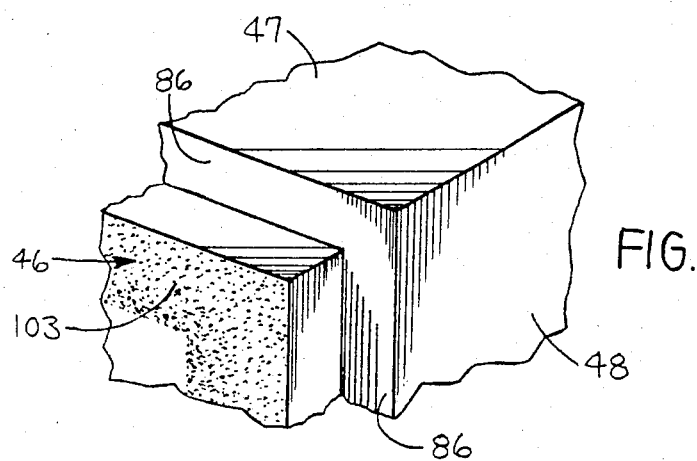
FIG. 11
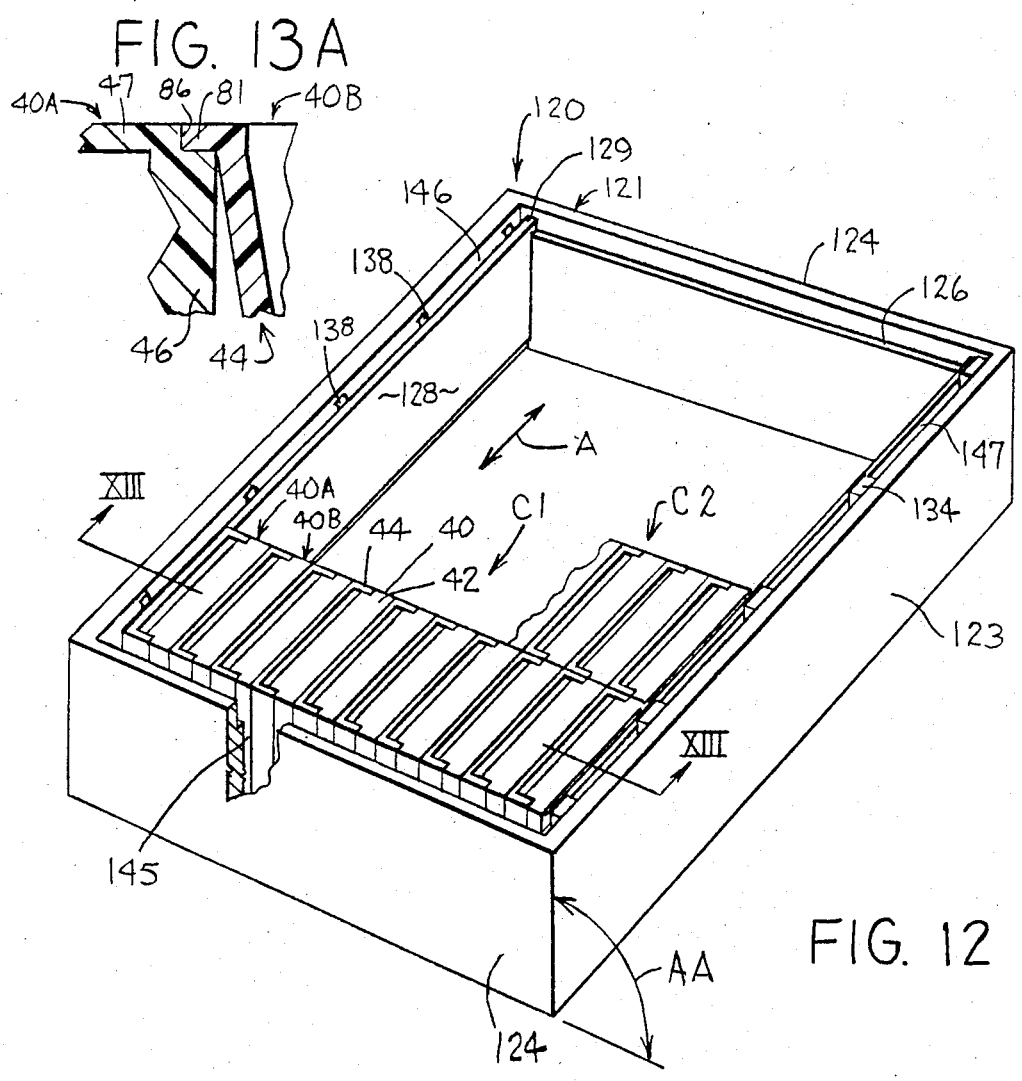
FIG. 13A
FIG. 12

APPARATUS FOR COMB HONEY

This is a continuation-in-part of application Ser. No. 581,762 filed Feb. 21, 1984, and now abandoned.

FIELD OF THE INVENTION

This invention relates to apparatus for production of comb honey and more particularly to comb sections and for positioning in a super in a hive for filling by bees.

BACKGROUND OF THE INVENTION

As discussed in more detail in the background of the invention portion of my prior U.S. Pat. Nos. 4,329,749 and 4,435,865, beekeeping has been intensively practiced for several hundred years but with relatively little change in hive apparatus since the invention of the wax foundation and the modern hive in the 1850's.

While most honey is separated from the comb in which it is formed in the hive before marketing, many people regard comb honey as a delicacy.

Prior to the time of my inventions resulting in the above-mentioned patents, the making of comb honey required considerable care, attention and inconvenience in provision and manipulation of the sections in which comb is to be formed by the bees and further involved an inconvenient and messy situation in the serving of comb honey at the table. For example, prior to that time, it was common to provide the foundation (upon which bees build comb) in the middle of a section. This was based on an assumption that the bees would build comb only as they do in nature, i.e. bilaterally. I found that bees could be made to build comb consistently, without the appearance of burr comb in one direction only (unilaterally) to substantial depths with my prior inventive apparatus disclosed in the above-mentioned patent and application. Such a relatively deep section, with comb honey extending only in one direction from the foundation (which may be termed a "half comb" section), could be taken from hive to table and served much more neatly since all of the comb honey is accessible from the open top of the section and the bottom of the section is closed by the foundation wall.

By way of further improvement, my above-mentioned U.S. Pat. No. 4,435,865 disclosed a further improvement in the form of a cover (1) implaceable on a section in such a way as to provide an opening into the section for bees when in the hive and (2) reinstallable at right angles to its hive position to close the section for marketing. Thus, a plurality of such covered sections, with the covers positioned for allowing bee entry, could be stacked in a horizontal column, with several such columns located side-by-side in the super, although this required a super provided with members extending beneath each column of covered sections to support same.

The above-mentioned apparatus, described in substantially more detail in my above-mentioned patent and application, has worked well. However, I have continued research and efforts to improve the manner in which comb honey is manufactured and marketed.

In the course of my research, I noted an effect shown in FIGS. 1 and 1A of this application. Prior sections have normally been constructed of a thin rigid opaque sheet material, commonly thin wood plank. FIGS. 1 and 1A show such a prior section 10 which has been taken from a hive after bees have completed their efforts in building wax comb 12 therein and depositing honey 14 within such comb. It is intended that bees build and fill comb up from foundation surface on the section bottom wall 18 and laterally to the section sidewalls 17. However, I found that bees will tend to build and fill to the full allocated space those comb cells in the central portion of such section 10, but will undesirably tend to leave a border of unfilled or substantially unfilled comb cells, typically of only partial wall height, adjacent the sidewalls 17. Since bees are not machines, in some sections 10 some perimetral comb cells may be partially filled with honey and, particularly in one or more corners, the cell structure several cells deep may be unfilled or only partially filled with honey. This has no disadvantageous effect on the taste of the honey or the capability of serving it directly from the section 10. However, it may have a disadvantageous psychological effect on persons accustomed to purchasing machine-filled containers of food products such as margarine, jam or jelly, peanut butter, etc. which are customarily filled to full width at uniform depth.

My research has led me to the discovery of a new principle of bee behavior; I have found evidence that the low levels of infiltrated light in a hive, or an unidentified source of visual stimulation, enable bees to take cues (hereafter termed visual cues) for comb construction from comb structure and/or bee activity on the opposite side of transparent walls or from their own reflection.

Accordingly, the objects and purposes of this invention include provision of:

Apparatus for production of comb honey which overcomes certain problems caused by the above-mentioned new principle of bee behavior while simultaneously exploiting this principle of bee behavior to achieve certain advantageous results and also correcting problems associated with previously used opaque structures (including the problem discussed immediately above).

Apparatus as aforesaid for inducing bees to build and fill comb to a uniform depth across the full width and length of a cassette, while discouraging building of burr comb at unwanted locations, such as the inside of cassette covers and upper corners of cassettes, and on the exterior of cassettes.

Apparatus as aforesaid which advantageously permits or blocks visual cueing of bees in one cassette by bees, or work done by bees, in an adjacent cassette or bee passage.

Apparatus as aforesaid permitting cassettes to be stacked, the cover of one to the base of the next, in a horizontally extending column, which column is self-supporting from end to end when its ends are supported.

Apparatus as aforesaid permitting use of a conventional super, with open top and bottom, to support a plurality of side-by-side columns of cassettes, and which permits stacking of a plurality of cassette-filled supers in a hive for honey gathering.

Apparatus as aforesaid permitting full face contact between side-by-side cassettes in adjacent columns in a super, with the bottoms of such cassettes facing in the same direction and without gaps therebetween capable of being filled with propolis or wax which could serve as cues for burr comb.

Apparatus as aforesaid which inhibits building of burr comb at the ends of bee entry slots thereof and at top corners of the cassettes.

Apparatus as aforesaid providing covered cassettes in hives with smooth, essentially crevice-free exterior walls to deter building of burr comb thereon which could cue building of inside burrs.

Other objects and purposes of the invention will be apparent to persons acquainted with apparatus of this general type upon reading the following specification and inspecting the accompanying drawings.

The objects and purposes of this invention are met by providing apparatus for producing comb honey in a hive and for marketing thereof. Cassettes for filling with comb honey may in broader aspects of the invention be open topped, boxlike sections or, preferably, may each include a boxlike base and a removable cover. The cassettes are stackable in side-by-side horizontal columns in a super. The side-by-side cassettes are constructed so that bees or structure in one cassette can influence production of comb honey in the adjacent cassette, to induce filling with honey to a uniform depth across the full width of each cassette while avoiding superfluous comb construction.

Attention is now directed to the accompanying drawings as briefly discussed immediately below.

BRIEF DESCRIPTION OF THE DRAWINGS

In the drawings:

FIG. 11 is a substantially enlarged fragmentary pictorial view of one lower corner of the cassette base of FIG. 3, substantially as taken along the direction of arrow XI in FIG. 3.

FIG. 12 is an oblique view in reduced scale showing FIG. 3 cassettes stacked base to cover in a column extending widthwise in a super capable of holding several such columns in a hive, the scale of FIG. 12 being reduced from that of FIG. 3.

FIG. 13A is an enlarged fragment of FIG. 13 showing nesting of stacked cassettes.

In the present application, the term "cassette" is used as a generic term and includes, for example, an open topped, boxlike section and a unit having a boxlike base with a removable cover.

In the following description, words "top" and "bottom" and variations thereof are applied to the cassettes and parts thereof in their orientation of FIGS. 3–5, 7 and 8, although it will be apparent that the cassettes are tipped onto a side thereof for use in the hive so that such "top" and "bottom" portions thereof face in a horizontal direction rather than upwardly and downwardly, respectively. On the other hand, the terms "top" and "bottom" are also applied to the super and parts associated therewith (other than cassettes) in the FIG. 13 orientation thereof.

DETAILED DESCRIPTION

Figure 2:
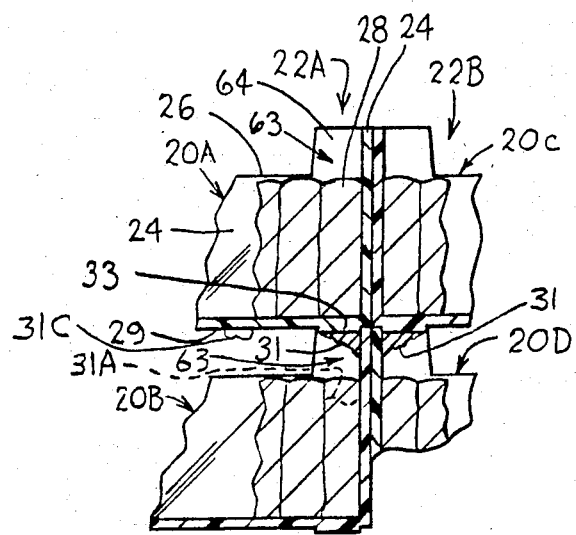
FIG. 2 is a fragmentary, top central cross-sectional view of sections of an embodiment of the present invention stacked in horizontally extending columns.
Figure 2A:
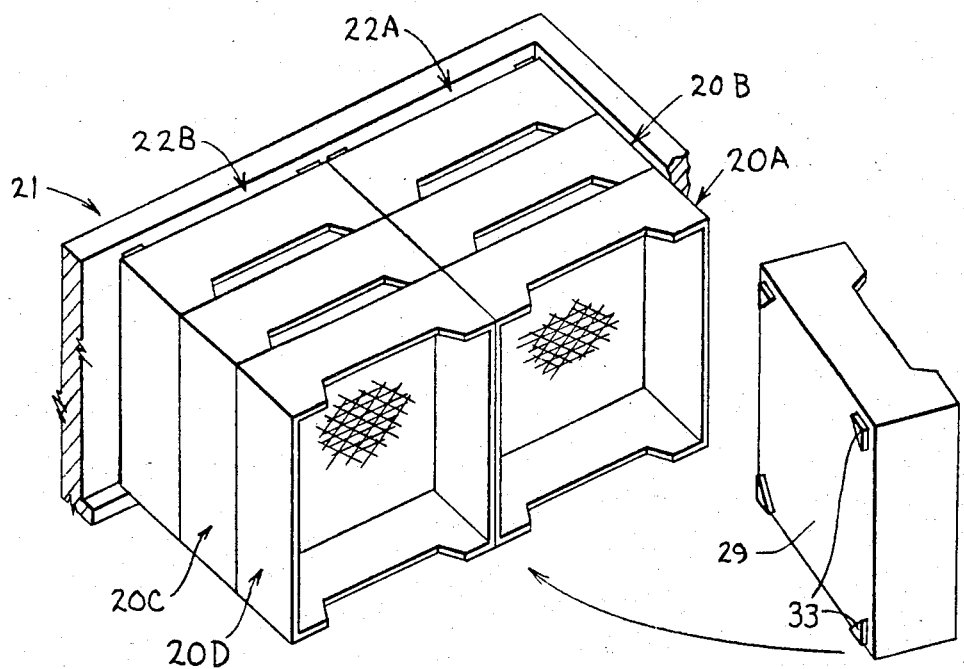
FIG. 2A is an oblique view in reduced scale showing FIG. 2 stacked sections, with one section pivoted out of its column to show the bottom thereof.

FIGS. 2 and 2A show a prototype embodiment of the present invention wherein sections 20A and 20B are stacked in one column 22A in a super shown fragmentarily at 21 and sections 20C and 20D are sections stacked in a column 22B beside column 22A. The top of at least one sidewall 24 of each section is notched at 26, as in my above-referenced U.S. Pat. No. 4,435,865, for entry of bees.

Rather than having the sections 20A–20D constructed of opaque material, such as conventional thin wood plank, the sections 20A–20D are constructed of a smooth, substantially transparent plastic material. I have found that bees will surprisingly tend to build comb and fill same with honey to a substantially constant height from sidewall to sidewall across the full width and length of the sections 20A–20D. There was a dramatic improvement in the construction and filling of outer cell rows completely up to the level of the lower edge of the bee entry slot 26, as in FIG. 2. This is desirable and contrasts with the neglected outer cell rows of the wood section 10 shown in prior FIGS. 1 and 1A above described. Sections with full height, fully filled comb cells 28 in contact with the section sidewalls 24 provide a superior product for marketing in that the purchaser and consumers will tend to see (and indeed receive) a container filled with food product across its entire width.

Figure 1:
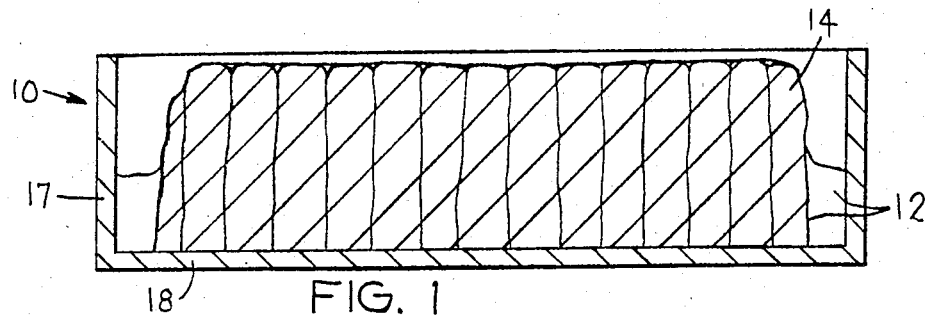
FIG. 1 is a central cross-sectional view of a prior type of wooden section which has been loaded by comb honey by bees in a hive.
Figure 1A:
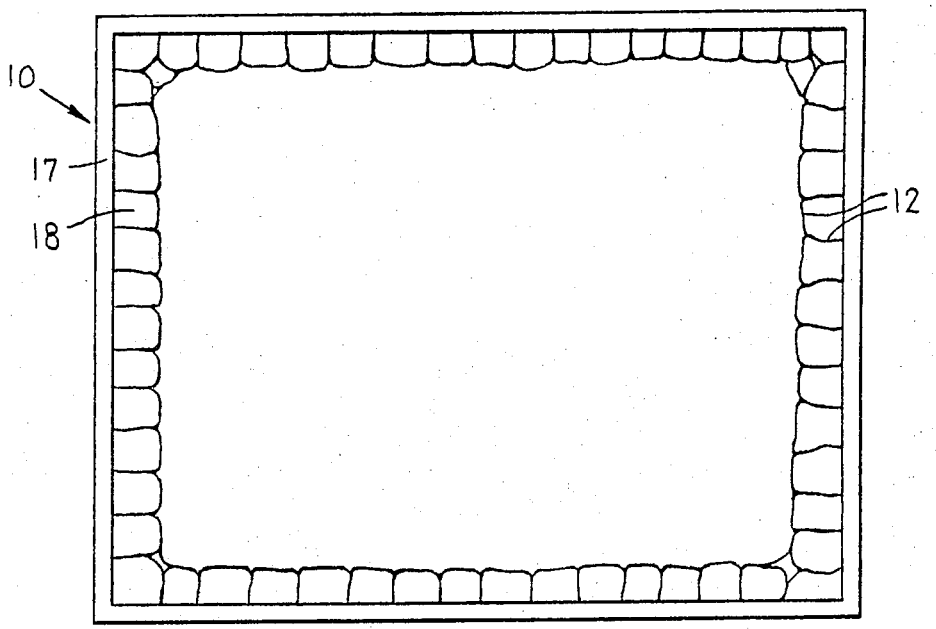
FIG. 1A is a top view of the FIG. 1 section.

It is not known precisely why in the FIG. 1, 1A structure bees tend not to build full height comb or fill same with honey adjacent the opaque sidewalls of the section but tend to do so in my transparent FIG. 2 structure. In comb honey sections of either the FIG. 1 or FIG. 2 type, bees do tend to start building comb and filling same outward from the center of the foundation surface which conventionally defines the top surface of the bottom wall of the section. Thus, once formation and filling of comb has started from the central portion of the section, the bees build onto the outer periphery of this initial comb core, and fills the resultant additional comb cells. It has been conventionally thought that this tendency of bees to build onto the outer periphery of the comb core is because of cueing by their sense of feel and smell of the comb structure in progress. I hypothesize that the tendency of bees to not attach comb to the opaque (e.g. wooden) sidewalls of conventional (e.g. FIG. 1) sections is due to the substantial absence of comb building cues thereon. However, the bee in my FIG. 2 section 20A adjacent substantially transparent sidewall 24 can in effect "see" rightwardly into sidewardly adjacent section 20C through the substantially transparent sidewalls thereof. I thus hypothesize that the bee must be "visually" cued, by what he can "see" in adjacent cell 20C and/or by reflections in sidewalls 24, to build and fill the perimetral cells 38 in section 20A.

My use herein of the term "visual" and the like is not limited to electromagnetic radiation in the range of wavelengths visible to humans but is intended to refer to wavelengths sensible by bees, including radiation in the infrared range.

I further hypothesize that the building of burr comb (such as that at 31 hereafter described) may again be due to bees in the section 20B being visually cued by the appearance, through the substantially transparent bottom wall 29, of either the foundation pattern or bee activity or by comb or honey-filled comb produced in the adjacent section 20A, or by reflections of bee activity in the subject section 20B from the smooth underside of the bottom wall 29 of the adjacent section 20A.

The FIG. 2 section has short protrusions 33 at the corners of the bottom wall 29 and which extend slightly below the remainder of the bottom wall 29 to laterally engage the adjacent sidewalls of the adjacent section 20B so that the two sections 20A and 20B in the column 22A are effectively interlocked against relative movement in a plane parallel to the bottom wall 29. In this way, if means at the ends of the column 22A press the sections 20A, 20B, etc. therein snugly top edge against bottom, and if the two endmost sections of the column are supported, column 22A will be self-supporting even though laid on its side to thus extend horizontally (the bottom sections walls 29 thus being substantially in vertical plane) without sagging of the column or a tendency for sections 20A, 20B, etc. to slide out of the column and drop downwardly. In this way, a given column 22A or 22B of sections 20A, 20B, etc. can extend from side to side in a simple rectangular frame super 21 without need for a supporting structure across the bottom of the super. Thus, the top and bottom of the super can advantageously be entirely open and thus free of now superfluous bottom slats. Further, elimination of bottom slats avoids blocking thereby of the advantageous visual cues to induce filling next to the lower cassette side.

On the other hand, I have also found in experiments with my FIG. 2 structure a surprising, and at first alarming, appearance of bizarre burr comb construction at several locations on the sections. There were three types of burrs, classified as to location as follows.

(1) Corner Burrs. I have found in my FIG. 2 construction a tendency of bees to build undesired burr comb (hereafter "corner comb") 31 in the three plane corner 63 formed where the tops of two sidewalls 24 of one section engage the bottom wall 29 of the next section of the top-to-bottom stacked sections (as at 20A, 20B). The comb surface of several filled FIG. 2 type sections showed some depression at most of the corners as shown in dotted line at 31A (FIG. 2). These depressions occurred irrespective of the presence of corner burrs 31, but were more pronounced when there were corner burrs 31. An almost identical three-plane corner exists in conventional $4\frac{1}{4}''$ wood sections located in a super with wood separators, which discourages the filling of section corners in a similar way. Yet corner burrs 31 do not often occur in such conventional wood sections. This FIG. 2 "corner effect" at first may be induced by the geometry of the three-dimensional stacked half comb sections 20A, 20B, etc. For the bees to honor the classical 5/16" Langstroth bee spacing is awkward. Therefore, the bees violate this imperative as comb construction approaches the section upper corner 63. Bees propolize these corners in the standard wood beeway supers just as they do in my clear FIG. 2 half comb section packed supers.

In the latter case, however, the propolizing at 31 in FIG. 2 is more pronounced—I believe to cover the irregularity caused by the presence of the cassette column support protrusions 33 resting at the section upper corner 63 and thus smooth out the corner contour. Once again, the primary difference is between opaque and transparent section construction. In the latter, I believe at these upper corners of a section 20B a bee can "observe" activity of other bees through all three transparent walls 24, 24, 29 forming the upper corner, and through the upper one 29 of these walls they also observe the foundation pattern of bottom wall 29 of the next section 20A along the stacked column 22A. The bees now attempt, I believe, to correct their inclination to violate bee space in such upper corners by insertion of small comb structures 31 starting from the corners outwardly. The remarkable matching of corner burr comb pairs in adjacent sections, when they appear (as at 31, 31 in sections 20B, 20D in FIG. 2), is convincing contributory evidence for my visual cue hypothesis. I also found that, occasionally, bees extend these burr combs along the juncture of the section sidewall top edge with the bottom wall of the next section along a column. These corner burr pairs 31, 31 tend to be paired and their extensions to be mirror images, matched in size and shape.

(2) Bottom Burrs. I further found that a second type of burr comb was occasionally initiated directly on the bottom 29 of a section 20A as though the bees inside the neighbor section 20B were attempting to build on the visible outline of the embossed foundation (not shown). Such bottom burrs seemed to be started in the early phase of comb building before the cells inside the section 20B began to receive nectar. Such bottom burrs were randomly placed on the section 20A bottoms, but favored locations away from the center. FIG. 2 shows the beginning of such a burr comb at 31C.

(3) Entrance Slot Burrs. I observed a third type of burr which originated as burr comb outside the sections 20A, 20B and then was extended into the sections by the bees. These burrs (not shown) inside the sections were aligned, having followed the course of the external burr comb. I believe the bees extended this external burr comb inside the sections due to the visible outline of the external comb structure.

My observations, in my FIG. 2 type structure, of improved filling of outside cassette rows and the increase of unwanted burr comb construction lead me to conclude that the use of clear and smooth plastic as the section material is indeed responsible for both. Where comb appeared on both sides of clear walls there was frequently a definite mirror image relationship; and comb structures appearing on only one side of a clear wall were opposite "visible" bee activity, or were on a reflective surface. Such evidence leads me to hypothesize that bees in some way "see through" the clear plastic walls and attempt to connect comb construction as though the wall were not there; and that the lower levels of infiltrated light in the hive, or an unidentified source of "visual" stimulation such as infrared radiation, perhaps from the bees themselves, enable bees to take cues for comb structures from comb structures and/or bee activity on the opposite side of transparent walls. A buildup of burr comb on the bottom of bottom wall 29 or on other section outer surfaces may detract from the appearance of the section 20A as a saleable item and the burr comb in the upper corners or along upper edges of the adjacent section 20B may be even more noticeable when comb honey is marketed in the section 20B. In addition, such burr comb tends to adhere together the two abutting sections 20A and 20B and thus make separating of them for marketing more difficult.

Figure 4:
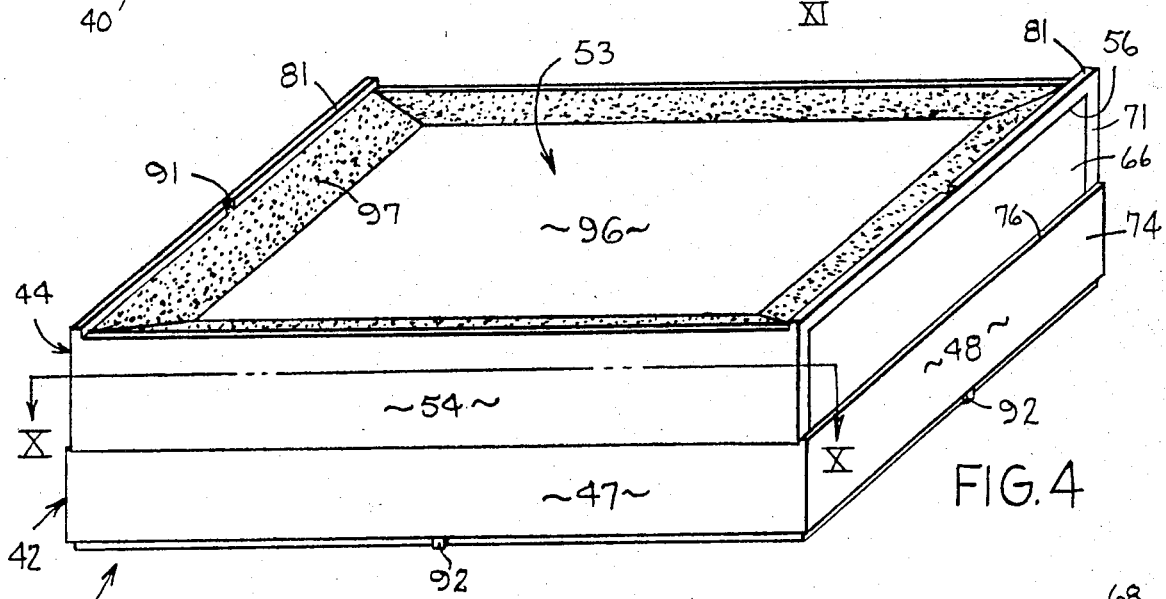
FIG. 4 is an oblique view of the cassette of FIG. 3 with its cover reoriented at 90° to its FIG. 3 position for closing the honey comb-filled cassette for marketing.
Figure 5:
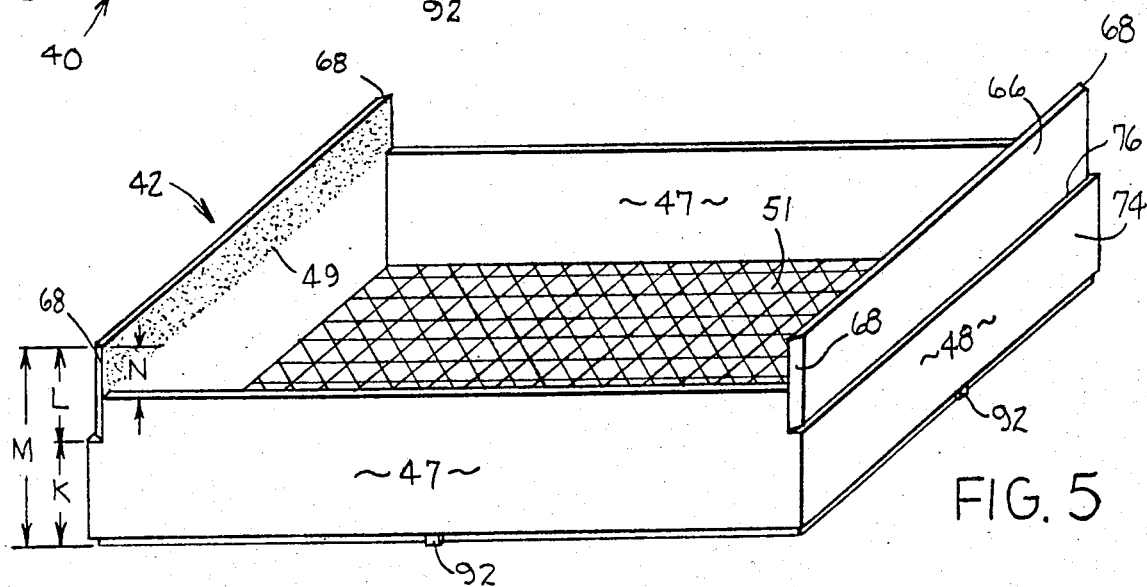
FIG. 5 is an oblique view of the base of the FIG. 3 cassette.
Figure 6:
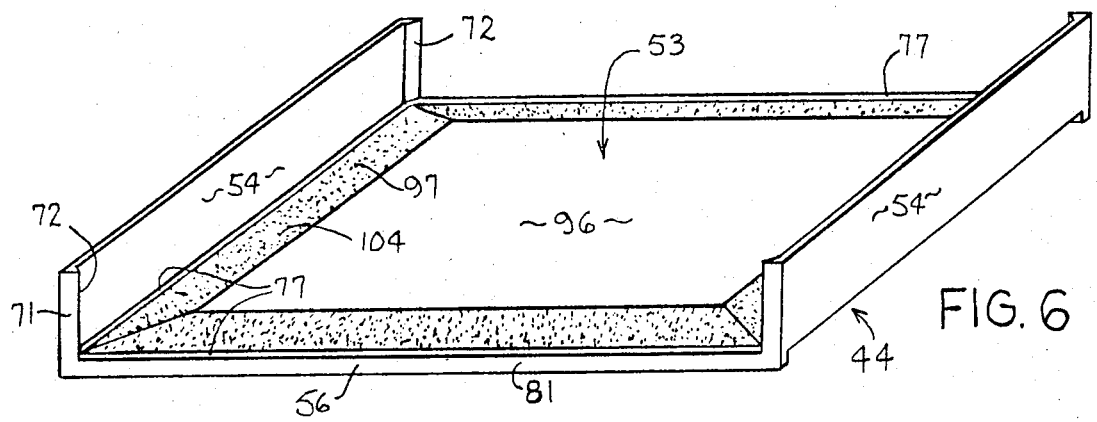
FIG. 6 is an oblique view of the FIG. 3 cover turned upside down.

FIGS. 3-6 disclose a preferred embodiment of my invention. A covered section 40 (for convenience hereafter referred to as a cassette 40) comprises a generally rectilinear boxlike, upward opening section, hereafter termed a base 42, (FIG. 5) and a cover 44 (FIG. 6). Except for non-transparent portions hereafter discussed, the base 42 and cover 44 are of a transparent or substantially transparent material and are preferably molded of a clear thermoplastic material such as food-quality clear polystyrene by a conventional molding process.

Figure 7:
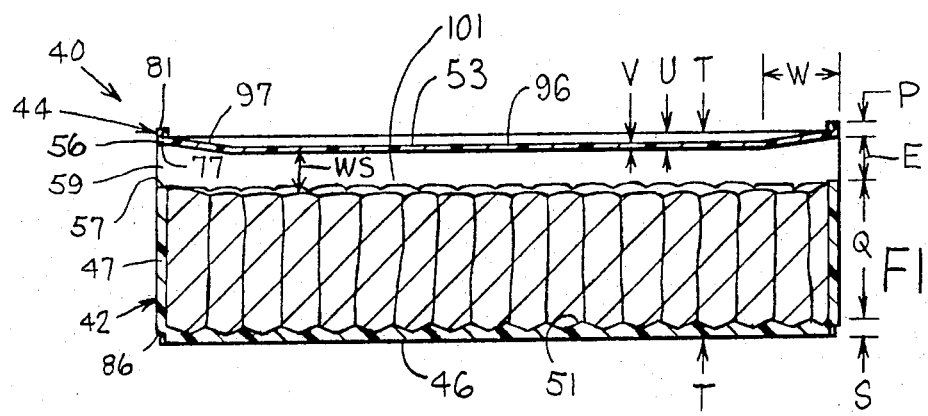
FIG. 7 is a central cross-sectional view substantially taken along the line VII—VII of FIG. 3.
Figure 8:
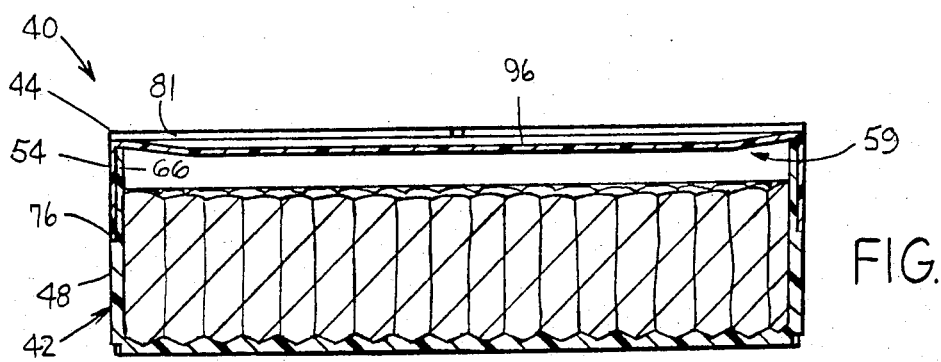
FIG. 8 is a cross-sectional view substantially taken along the line VIII—VIII of FIG. 3.
Figure 9:
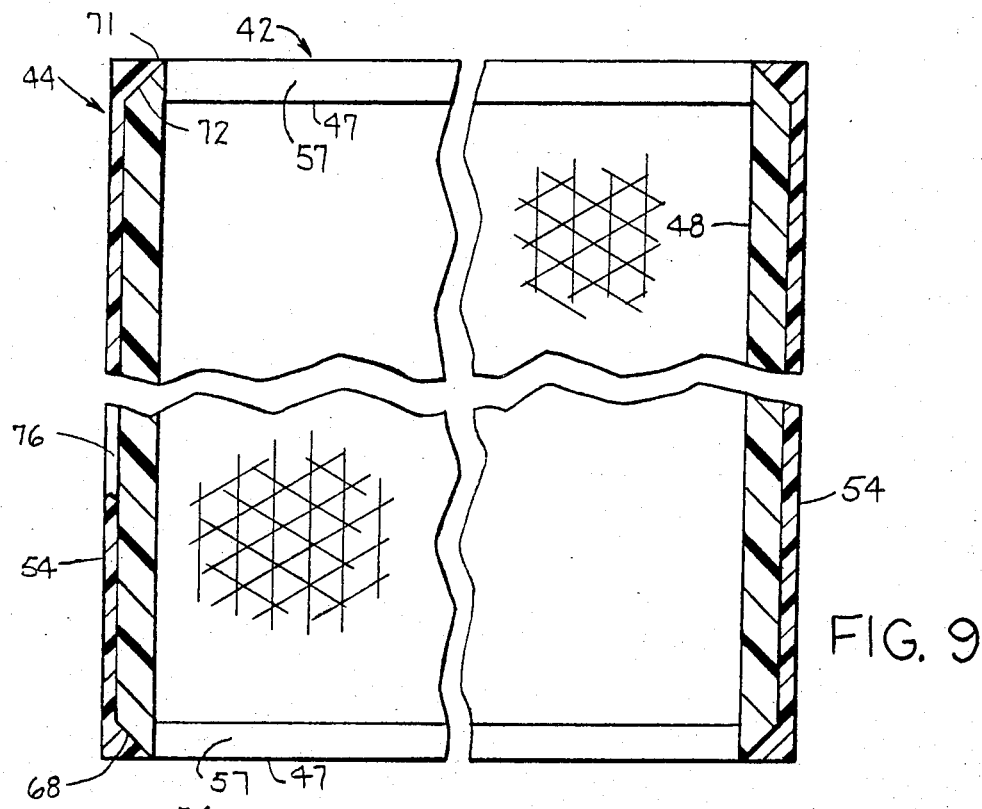
FIG. 9 is a substantially enlarged fragmentary cross-sectional plan view substantially taken on the line IX—IX of FIG. 3.

Base 42 comprises a bottom wall 46 and opposed pairs of sidewalls 47 and 48. As seen in FIGS. 5, 7 and 8, the upper surface of bottom wall 46 is provided with a conventionally contoured foundation surface 51. The foundation surface contour is preferably molded integrally in the upper face of the bottom wall 46 and wax coated. However, the foundation surface 51 may alternately be a conventional molded wax foundation sheet laid atop a flat upper surfaced bottom wall 46, although this has greater manufacturing cost and is thus less preferred. The foundation surface 51 is intended to act in a conventional manner to induce bees to build and fill comb atop thereof. In the embodiment shown, the underside of the bottom wall 46 is flat.

The cover 44 (FIGS. 4 and 6) comprises a top wall 53 and an opposed pair of depending sidewalls 54. The remaining two sides of the cover are open, i.e. devoid of sidewalls.

Figure 3:
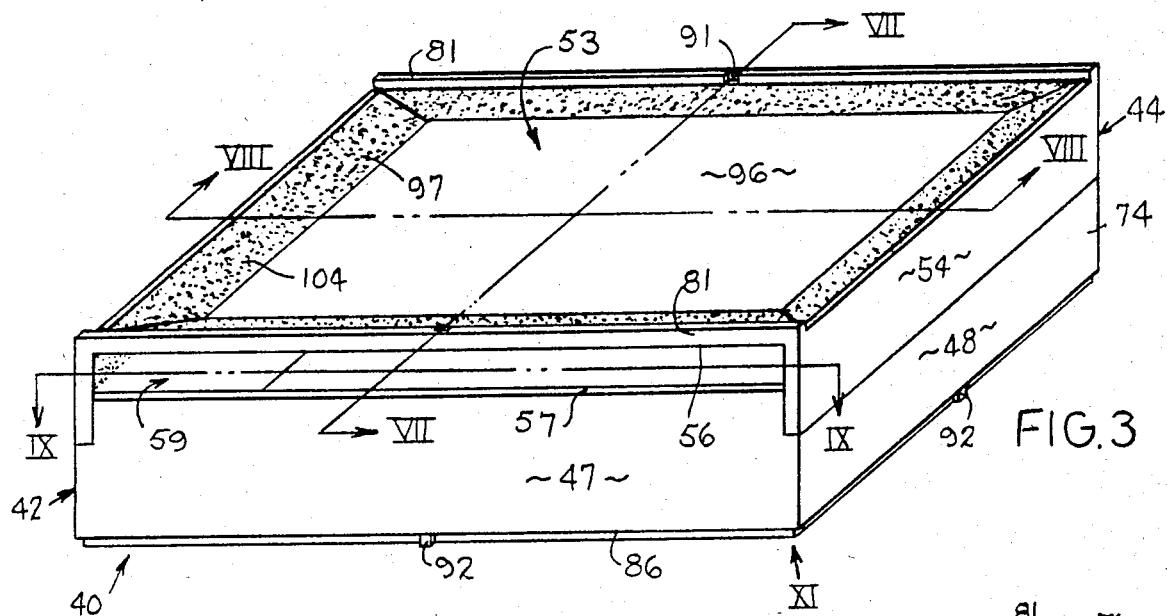
FIG. 3 is an oblique view of a cassette embodying the invention, with its cover oriented to admit bees for producing comb honey in a hive.

As seen in FIGS. 3 and 5, the base sidewalls 47 are shorter in height than base sidewalls 48. The length and width (side-to-side) dimensions of the base 42 and cover 44 are related so that the cover can be placed upon the base in the orientation shown in FIGS. 3 and 7, namely with the cover sidewalls 54 adjacent and snugly overlapping the base sidewalls 48 in a manner more fully hereafter described, and with the unwalled side edges 56 of the cover spaced above the top edges 57 of the shorter base sidewalls 47 to form a bee entry slot 59 which extends virtually the full width of each of the pair of shorter sidewalls 47. Each of the opposed bee entry slots 59 is bounded at the top by the top wall 53 of the cover 44 and at the bottom by the top edge 57 of corresponding base sidewall 47. The ends of each bee entry slot 59 are bounded by the inside surfaces of the other base sidewalls 48.

By extending the bee entry slots to the full width of the cassette, the present invention thus eliminates the residual three-sided corner, like that generally indicated at 63 in FIG. 2, formed by the sidewall segment 64 at the end of the notch 26. Such three-sided corners 63 at the ends of the bee entry notch 26 have at times in the past served as locations for the start of unwanted burr combs by bees, and also have tended to discourage the bees from fully filling the lower corners of the section of the cassette base below such corners 63, even when the walls of the section are of conventional opaque material such as wood. No such three-sided corners 63 are formed in the cassette according to the present invention since the bee entry slot 59 extends the full width of the base wall 47. Thus, the inventive structure tends to discourage, rather than encourage, building of burr comb by bees at the upper corner locations of the cassette.

Despite extension of the bee entry slots 59 to the full width of the cassette interior, it is nevertheless possible under the present invention to install the cover 44 in its alternate, 90° shifted FIG. 3 hive position and FIG. 4 marketing position, and yet prevent sliding of the cover 44 on the base 42 in a direction parallel to the plane of the cassette base bottom wall 46. To accomplish this, the cover 44 is locked against horizontal sliding on the base 42 by a beveled interconnection at the corners of the base as shown in FIGS. 5, 6, 9 and 10. More particularly, the upper portion 66 of each base sidewall 48, namely the portion overlapped by the sidewall 54 of the cover 44 in FIG. 3, has its upstanding end edges beveled as seen at 68 in FIG. 5. The height of the bevels 68 and of the upper wall portion 66 corresponds to the interior height of the sidewalls 54 of the cover 44. Correspondingly, the vertical end edges of the cover sidewalls 54 have, as seen in FIG. 6, narrow end flanges 71 extending a short distance inward along the side edges 56 of the cover and provided with inward facing bevels 72. The inward facing bevels 72 of the cover 44 and outward facing bevels 68 of the base 44 are correspondingly angled (in the embodiment shown at 45° to their corresponding sidewalls). All four bevels 72 and all four bevels 68 are located at the corners of a square, to permit the cover 44 to be dropped snugly down over the upper portion of the base 42, in both the FIG. 3 or FIG. 4 position thereof, with the beveled cover surfaces 72 sliding downward in snugly facing contact along the bevels 68 at the base 42.

The cassette 40 is constructed so that with the cover 44 installed on the base 42 in its in-hive position of FIG. 3, the exterior surfaces of the cover side 54 is flush with the base side 48. As seen in FIG. 12, this provides the important advantage that no gaps, capable of having burr comb inserted by bees, are present between the cassettes of adjacent cassette columns in a super. To accomplish this, the bottom portion 74 of the base sidewalls 48 is made thicker than the upper portion 66 thereof, leaving an upward facing ledge 76 atop the bottom portion 74 outside the bottom of the upper portion 66. The cover sidewall 54 and ledge 76 are of the same width. Accordingly, with the cover 44 in its hive position of FIGS. 3 and 9 on base 42, the exterior surfaces of the cover sidewall 54 and the lower portion 74 of base sidewall 48 are flush.

The interior height of the cover sidewalls 54 and the height of the base sidewall upper portions 66 are preferably substantially identical such that the lower edge of the cover sidewall 54 seats upon ledge 76 with the upper edge of the base sidewall upper portion 66 abutting or substantially abutting the underside of the cover top wall 53. To this end, the bottom of cover top wall 53 is bordered by, immediately inboard of sidewalls 54 and directly beneath side edges 56, a planar border face 77 (FIGS. 6 and 7). The border face 77 is of sufficient width to sit flush atop the upper portion 66 of the base sidewall 48 with the cover 44 in both its FIG. 3 hive position and FIG. 4 marketing position on the base.

In the embodiment shown, the exterior width of the base 42 at the outside of its sidewalls 47 is the same as at the outside of the upper portions 66 of its sidewalls 48. This enables the cover to slide over, with its sidewalls 54, both the base sidewalls 47 and upper portions 66 for shifting of the cover 44 from its FIG. 3 hive position to its FIG. 4 marketing position.

Figure 10:
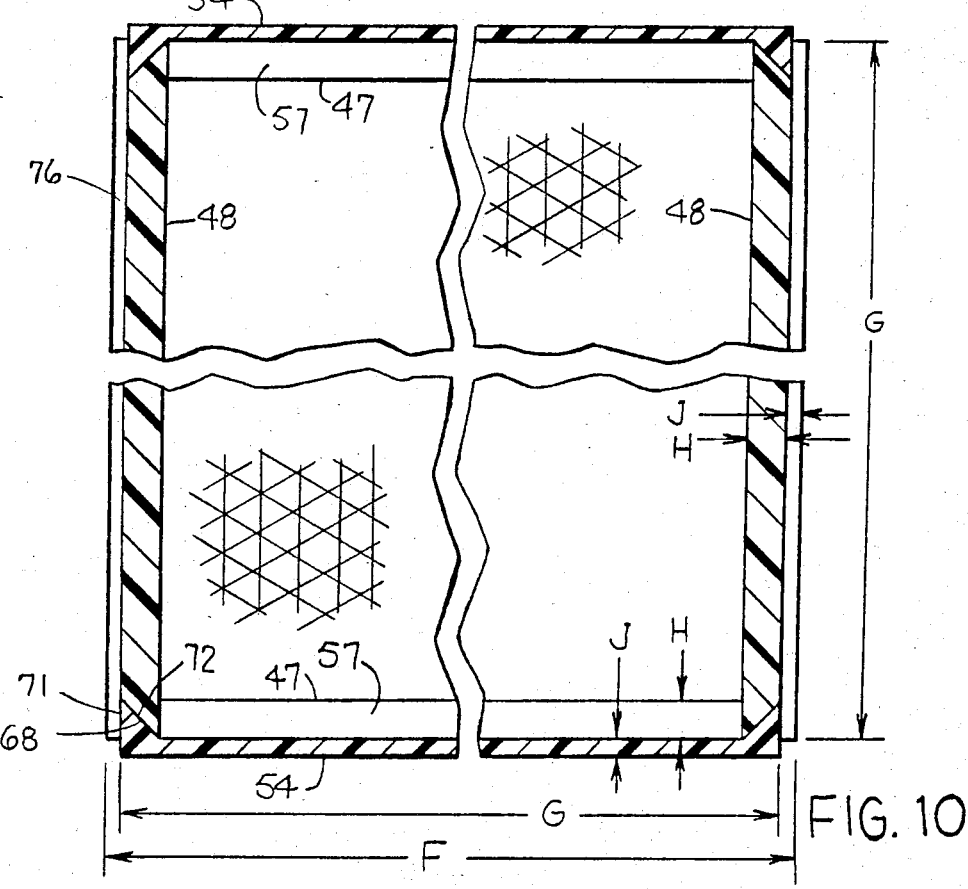
FIG. 10 is a substantially enlarged fragmentary cross-sectional plan view substantially taken on the line X—X of FIG. 4.

If desired, the lower portion of the base sidewalls 47 may be provided with widened lower portions and facing ledges corresponding to the base sidewalls 48 at 74 and 76. However, such is not necessary since it is not necessary that the sidewalls of the cassette be flush in the marketing position. Accordingly, in the preferred embodiment shown, to simplify construction of the mold, the outer face of base wall 47 is flush. Accordingly, as seen in FIGS. 4 and 10, the sidewalls 54 of the cover 44, in the marketing position of the latter, jut out, to the extent of their thickness, beyond the outer face of base sidewalls 47. Also in the marketing position, the upward facing ledges 76 of remaining base sidewalls 48 are exposed.

Figure 13:
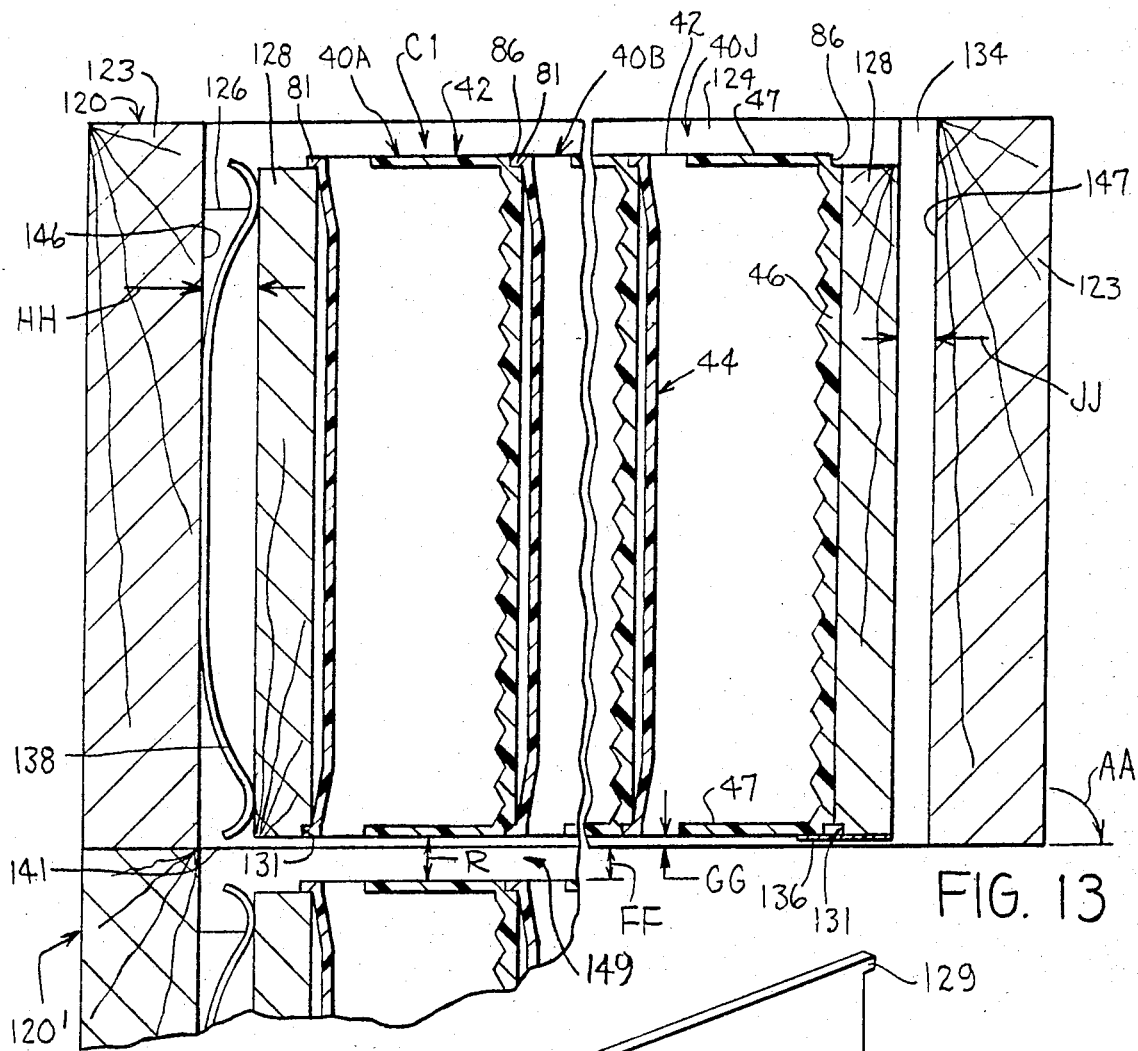
FIG. 13 is an enlarged fragmentary cross-sectional view substantially taken on the line XIII—XIII of FIG. 12.

To enable stacking of cassettes 40 in a horizontally extending column with the central portion of the column self-supporting, as at C1 and C2 in FIGS. 12 and 13, the cassette base 42 and cover 44 include a complementary ridge and stepped ledge arrangement. This locks adjacent cassettes in a column C1 or C2 of stacked cassettes against falling out the open bottom of a super of the type hereafter discussed with respect to FIGS. 12 and 13.

More particularly, in the preferred embodiment shown, the cover 44 has an upstanding ridge 81 (FIGS. 3 and 7) atop each of the side edges 56. The bottom perimeter of the base 42, at the joinder of the bottom wall 46 and sidewalls 47 and 48, is provided with an inwardly stepped portion defining a downwardly facing ledge 86 (FIGS. 3, 7 and 11). The ledge 86 preferably extends around the entire perimeter of the base 42 and hence is found at the bottom of the sidewalls 47 as well as the sidewalls 48. The cross-sectional height and width of the ridges 81 and ledge 86 correspond as does their separation across the width of the cassette 40. Thus, the cassettes 40, in both their FIG. 3 and FIG. 4 states, are stackable in a nested manner, with the bottom of the base of one atop the top of the cover of the next to form a column, such as the column C1 in FIGS. 12 and 13, wherein the ridges 81 (FIG. 13) of the cover of one cassette 40B nest against the ledge 86 of the next cassette 40A in the column C1. When so stacked, the top (facing leftward in FIG. 13A) of the ridge 81 of cassette 40B fits snugly against the underside (facing right in FIG. 13A) of the ledge 86 of adjacent cassette 40A so as to provide a flush connection, without significant opening, along the outer surfaces of the ridge 81 and adjacent cassette base sidewall 47. This flush, smoothly closed fit eliminates a gap that bees would tend to fill with unwanted propolis or wax in the hive, to the detriment of marketability of the filled cassette and to avoid a tendency of bees to build burr comb within the cassette when visually cued through transparent cassette walls by burr comb on the outside surface of the cassette. If necessary to establish this flush smoothly closed fit, the height of the ridge 81 may be slightly greater than that of the ledge 86, so as to provide a small clearance between the bottom 46 of cassette 40A and the opposed top surface of the cover 44 of adjacent cassette 40B.

The interaction of the ridges 81 and ledges 86, above described, eliminates any need for the protrusions 33 of FIGS. 2 and 2A for stacking of cassettes in the hive, and thus avoids the tendency of such protrusions within a section to induce bees to build burr comb therefrom.

Just as FIGS. 12, 13 and 13A show the cassettes stacked in a column C1 in a super for honey gathering in a hive with the ridges 81 flush with adjacent cassette base sidewalls 47, the cassettes 40 are similarly stackable for marketing, in their FIG. 4 condition, with the ridges 81 nested with ledges 86 flushly below the cassette base sidewalls 48.

With cassettes 40 for honey gathering stacked as shown in FIGS. 12 and 13, because of interference between the ridge 81 and ledge 86, the cassette 40B cannot move up and down in FIG. 13 with respect to adjacent cassette 40A. However, the interfitting of ridge 81 and ledge 86 cannot prevent sliding of cassette 40A along the length of the ridges 81 of cassette 40B (into and out of page in FIG. 13 and in the direction of arrow A in FIG. 12). The ability of cassettes 40A and 40B to thus relatively slide sideways is not a problem with the cassettes in the hive because a sufficient number of columns C1, C2, etc. of cassettes will normally be provided in a given super to fill same, leaving no room for cassettes 40A and 40B to so relatively slide along the length direction of the ridges 81.

In some instances it may be desired to prevent relative sliding of stacked cassettes parallel to either cover sidewalls 54 or cover side edges 56. Such would be helpful, for example, when filled cassettes are vertically stacked on store shelves for sale.

Since the ledge 86 extends around all four sides of the base 42, one contemplated alternative is providing ridges 81 on all four sides of the cassette cover, to enable the cover to mechanically lock into the ledges 86 of a cassette stacked thereon and prevent any relative movement therebetween in a plane parallel to the cassette bottom 46. However, the resulting additional pair of ridges atop cover sidewalls 54 would interfere with support of the cover of the top cassette 40A in the super of FIGS. 12 and 13 or would complicate the construction of the latter.

To avoid that problem, yet positively preclude all relative sliding of stacked cassettes, the present invention provides the ridges 81 and ledges 86 with coactive notches 91 and lugs 92 (FIGS. 3, 4, 15 and 15A). In the embodiment shown, the notches 91 are centered along the length of the ridges 81, open upwardly and open inwardly toward each other. The lugs 92 are centered along the length of all four ledges 86 and protrude downwardly and laterally outwardly. If desired, the notches 91 can extend through the entire thickness of the corresponding ridges 81 and the lugs 92 can correspondingly extend laterally outward flush with the exterior face of the corresponding sidewall 47 or 48. However, in the embodiment shown, the lateral depth of the notches 91 and lugs 92 is only about half that of the ridge 81 and ledge 86 so as to provide the exterior (leftward in FIG. 15A) face of the ridge 81 as an unbroken surface.

It will be seen from FIGS. 3-8 and 13 that the top wall 53 of the cover 44 is dished, the major central portion of such top wall 53 being offset somewhat below its peripheral edge (toward the opposed foundation surface 51 of its corresponding base 42). This downwardly offset central portion 96 is bounded on each of its four sides by a narrow, upward sloping (in FIG. 3) portion 97, which is generally trapezoidal in plan. The sloped portions 97 are in turn bounded by the narrow border face 77 (FIG. 6). Such dishing of the major central portion 96 of the cover top wall 53 tends to induce bees to stop building comb up from the foundation 51 (FIG. 7) when they achieve a substantially level upper comb surface 101 approximately at the bottom edge of the bee entry slot 59 (top edge 57 of the base sidewall 47). More particularly, bees require a certain minimum height at the entry slot 59 to be induced to enter the cassette 40. Further, once in the cassette, bees require a working space of a certain minimum height and will stop building comb when the top of the comb has been built up from the cassette bottom to within that minimum working height of the top of the cassette, in this instance the underside of the cover 44. Typically, the minimum working height WS within the cassette is about the same as the entry height E. Thus, by slightly dishing the central portion 96 of the cover 44 the bees are obliged to "dish" the comb surface guided by the dishing of the cover 44 (always about 9/32" to 5/16" away therefrom). Thus, as seen in FIGS. 7 and 8, the lower entry slot edge 57 is slightly above the central comb surface. This slight dishing serves to prevent honey overflow in use by the consumer.

As stated, the material of the cassette base 42 and cover 44 is preferably a transparent or semi-transparent plastic material. However, it has been found advantageous to make several areas of the cassette non-transparent (opaque or substantially opaque) and non-reflective so as to prevent or diffuse vision therethrough and reflections therefrom of images. Such can be done in a variety of ways, but in the embodiment shown it is convenient to frost the surfaces in question. Although frosting either the outside surface or inside surface of a cassette wall impairs a bee in the cassette from receiving "visual" cues through such wall from outside the cassette, frosting the inside surface additionally prevents a bee in the cassette from receiving "visual" cues due to reflection from said wall. Thus, on a cassette wall portion where building of comb is to be discouraged, both transparency and interior surface reflectivity are to be reduced, e.g. by frosting the interior surface.

Thus, in the embodiment shown, the bottom wall 46 of the cassette base 42 is frosted on the underside thereof (as indicated at 103 in FIG. 11) or both sides thereof, so that the pattern of the foundation 51 and any comb (honey-filled or otherwise) built thereon in the cassette base 42 and reflections will not be visible below the cassette base, so bees tend not to build comb downward therefrom in an underlying cassette.

The peripheral edge portions of the cover are also frosted, on the lower and upper side thereof (sloped trapezoidal portions 97 of the cover 44 as seen at 104 in FIG. 3 and at 104 in FIG. 6), to even more strongly discourage bees "seeing" through these sloped perimetral portions 97 of the cover top wall into the bottom wall 46 of the cassette thereabove and "seeing" reflections therefrom, and thereby to further discourage bees from building burr comb downward from the upper edges of a cassette cover.

Due to the lesser tendency of bees to build comb downward from the central portion 96 of the cassette cover top wall, such central portion 96 of the cassette cover top wall, and if desired the central portion of the cassette base bottom wall 46, can be left clear. This is advantageous in marketing, as are transparent, or mostly transparent, sidewalls 47, 48, 54 of the cassette, to allow the buyer to view the comb honey in the cassette before purchasing.

As mentioned, the transparency of the sidewalls 54 and 48 is important in inducing bees to build and fill comb to full height (essentially to the bottom of the bee entry slot 59) when cassettes are arranged in the hive in a super in side-by-side abutting columns C1, C2, etc. (FIG. 12), such that the bees tend to build and fill comb along the plane of adjacent cassette base bottom walls almost as if the side-by-side abutting cassette sidewalls 48, 54 were not there. However, it is desirable to reduce or eliminate in a cassette bee "vision" through, and reflection from, those interior surface portions 49 (FIG. 5) of base sidewalls 48 located above the top edge 57 of the other base sidewalls 47. This can be done by frosting the interior surface portion 49 on each sidewall 48. The purpose is to suppress the tendency of bees to build comb on the interior surface portions 49, both for better marketing appearance and to prevent unwanted sticking by burr comb of the top of a cassette base 42 to its cover 44 (or to the bottom wall of the opposed cassette base 42 if no covers 44 are used in the hive).

It is conventional to locate a plurality of sections for honey collection in side-by-side columns in a super, and to stack a series of such supers vertically as part of a hive. Bees travel vertically in such a hive, the top and bottom of each super being conventionally open except for underlying transverse slats on which sections in the super are supported. Conventional sections provide upward and downward opening entries so that bees can travel upwardly through a succession of sections carried in an upstanding stack of supers in the hive. Prior examples are shown in my prior U.S. Pat. No. 4,329,749 and the published British application No. 2 023 395 of Ambrose.

The above-described cassettes 40 embodying the present invention are configured for use with conventional, commercially available hive supers of the kind shown in FIGS. 12 and 13 at 120. Such a conventional super 120 comprises an upwardly and downwardly open wood plank frame 121. The frame 121 comprises opposed side planks 123 connected at their ends by opposed end walls 124. Such end walls 124 have conventional upward facing ledges 126 near the top thereof which are conventionally used to pendently support conventional full width comb frames. While the cassette of the present invention can be used with specially designed supers it is advantageous, to minimize inventory and to facilitate use with existing equipment of established beekeepers, to dimension the inventive cassettes 40 for use with such a conventional super 120.

Figure 14:
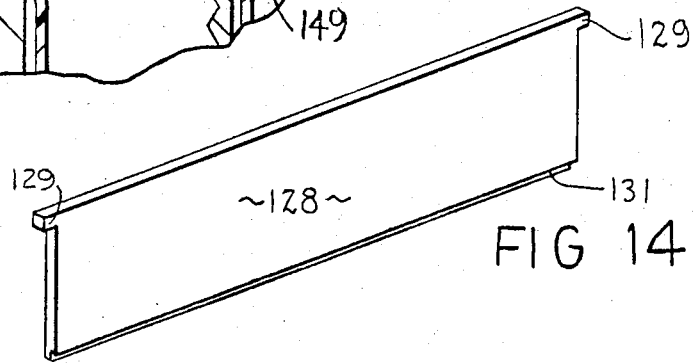
FIG. 14 is an oblique view of a follower board of a kind located at the end of the column of cassettes in the FIG. 12 super.
Figure 15:
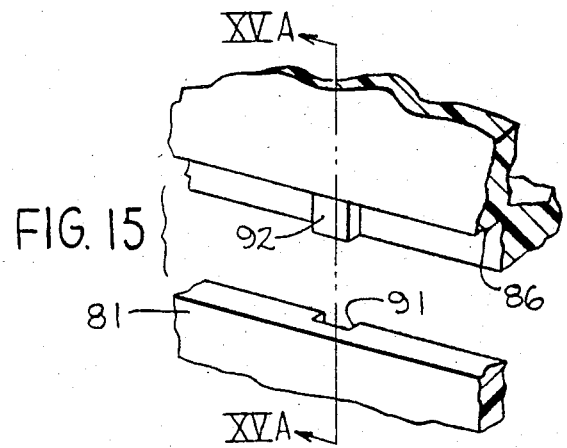
FIG. 15 is a fragmentary enlarged oblique view of a notch and lug structure by which the base of one cassette is prevented from sliding in one direction on the cover of an opposed cassette.
Figure 15A:
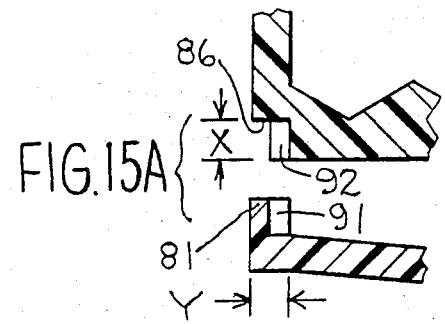
FIG. 15A is a fragmentary cross-sectional view substantially as taken along the line XVA—XVA of FIG. 15.

As above discussed, the cassettes 40 embodying the invention can be stacked in the centrally unsupported, non-sagging horizontal columns C1, C2 if pressed together and vertically supported at the endmost cassettes of the column by suitable support means. While use of support means of various kinds is contemplated for use with such a super 120, the present invention preferably provides a pair of follower boards 128 (FIG. 14) of any substantially rigid material (preferably opaque and conveniently wood plank). Each board 128 has opposite ends provided along its upper edge with longitudinally extending lugs 129 to be supported on the ledges 126 of the super 120 as seen in FIG. 12 for pendently supporting the follower board between the end walls 124 of the super. One lower edge of each follower board 128 is undercut to form a downward facing ledge 131. In FIGS. 12 and 13, the rightward follower board 128 is spaced from the rightward super sidewall 123 by a plurality of upstanding, laterally spaced spacers 134, conveniently narrow wood strips. The rightward follower board 128 is, as seen in FIG. 13, additionally provided along its bottom edge with a fixed (as by nails, adhesive or any other convenient means) thin metal strip 136, which in the embodiment shown extends the full length of the rightward follower board 128 and also extends leftwardly (into the cavity of the super) a distance exceeding the depth of the ledge 86 at the bottom of a cassette 40.

The leftward follower board 128 is resiliently spaced from the leftward super sidewall 123 by a laterally spaced plurality of upstanding leaf springs 138. The leaf springs 138 are conventional, extend substantially the height of the leftward follower board 128, and are compressible between the leftward follower board 128 and leftward super sidewall 123 for resiliently compressibly sandwiching between the two follower boards 128 the column C1 of cassettes 40.

Whereas the spacers 134 are normally permanently fixed in the super by attachment to the adjacent rightward sidewall 123, both follower boards 128 and the several leaf springs 138, along with the columns of cassettes C1, C2, etc., are removable from the super.

The rightward and leftward follower boards 128 are hereafter termed, respectively, the movable and fixed follower boards (though both are only frictionally fixed against lifting from the super by the loading of the springs 138 because rightward movement of the rightward follower board 128 is prevented by contact with the rigid spacers 134 whereas rightward-leftward movement of the leftward follower board 128 is resiliently permitted by the adjacent leaf springs 138.

As seen in FIG. 13, a column C1 of cassettes 40 (the leftwardmost two of which are indicated specifically at 40A and 40B) are stacked in a horizontal direction between the follower boards 128 in the super 120. The rightwardmost cassette 40J has its bottom wall 46 seated against the fixed follower board 128 and rests with its short sidewall 47, in the portion thereof near the bottom wall 46, on the projecting portion of the metal strip 136. The metal strip 136 thus prevents the base of the cassette 40J from sliding downward along the fixed follower board 128. The top of the follower board 128 is preferably flush with the ledge 86, rather than the upward facing sidewall 47 of cassette 40J, to avoid a narrow groove which bees may tend to fill with burr comb. The cover 44 of cassette 40J is fixed upon its base 42 in the manner above discussed with respect to FIGS. 3, 7 and 8, the bevels 68 and 72 (FIGS. 6 and 5, respectively) preventing movement vertically in FIG. 13 of the cover with respect to its base.

At the other (leftward) end of the column C1, the cover 44 of cassette 40A has its upper ridge 81 resting atop the leftward (movable) follower board 128. Its lower ridge 81 is received in the ledge area 131 at the bottom of the leftward follower board 128. In this manner, the leftwardmost cassette 40A is vertically supported by its cover 44, through the leftward follower board 128 on the super 120.

The ridges 81 on cover side edges 56 (FIG. 3) fit over and under the adjacent top and bottom surfaces of the movable follower board 128 as shown in FIG. 13, with the upper edges of the cover sidewalls 54 flat against the opposed flat surface of the movable follower board 128. Thus, the two follower boards 128 can be identical and flat. If ridges 81 were provided on all four sides of the cover 44, it would be necessary to cut vertical grooves in the face of the movable leftward follower board 128 to receive the extra ridges, an extra manufacturing operation. Such vertical grooves would not be wanted in the rightward, nonmovable follower board 128 because the latter grooves would be unoccupied in the hive and would thus invite filling with unwanted propolis by bees.

The cassettes of column C1 between the endmost cassettes 40A and 40J are pressed together by the compressed springs 138 and are precluded from sliding downward out the open bottom 141 of the super 120 by horizontal overlapping of the ridges 81 of the intermediate covers 44 with the ledges 86 in the base 42 of each adjacent cassette base 40. Thus, as long as the cassettes of the column C1 are held resiliently pressed base to cover, the horizontal column C1 is rigid and fixed and will not bend or drop through the open bottom the super 120 despite lack of underlying transverse slats. The absence of slats in super 120, in addition to reducing equipment requirements, advantageously facilitates cassette filling by allowing visual cues to bees in a cassette from bee activity therebeneath in the hive. On the other hand, follower boards 128 which are opaque advantageously further block visual cues to bees in endmost cassettes 40A and 40J in column C1 from bee activity in passages 146 and 147 respectively.

In conventional hives, a series of supers are stacked one atop the other with communicating openings so that bees may travel upward and downward from super to super. In the same manner, several supers 120, equipped with cassettes 40 as above described, when in the hive may be stacked, for example as at 120 and 120' in FIG. 13. Parts associated with super 120' carry the same reference numerals as those associated with super 120, but with a prime mark (') added. Hives are conventionally provided with a hive cover and a hive base (not shown) which respectively overlie and underlie the vertical stack of supers. Conventional hive covers and/or hive bases provided bee access from the outside atmosphere to the adjacent open top or bottom end of the adjacent super. Such is conventional and well known and needs no further description or showing.

With the super 120 packed with full columns C1, C2, etc. of cassettes 40 (e.g. four columns per super), the column C1 at the left end of the pack in FIG. 12 and the column (not shown) at the rightward end of the pack are spaced from the respective left and right super end walls 124 by spaces 145 which serve as bee passages. Bee activity in such spaces 145 can visually cue bees in adjacent cassettes. The spaces 145 are preferably of width equal to the standard Langstroth bee space (about 5/16 inch) to deter comb building in spaces 145.

In a hive equipped with the inventive apparatus of Applicant's FIGS. 12 and 13, much as in some prior hive constructions, room is provided for bees to travel vertically from super to super through the hive. In the present invention, such room is provided in passages 146 between the movable follower board 128 and adjacent super sidewall 123 (between the leaf springs 138 therein) and in passages 147 between the fixed follower board 128 and the adjacent super sidewall 123 (between the spacers 134 therein) and aforementioned spaces 145. Such passages 146 and 147 extend vertically from super to super. Further, the cassettes 40 in each column C1, C2, etc. are spaced somewhat below the top of the super 120 and above the bottom thereof as seen in FIG. 13, such that a room 149 of height R sufficient for lateral bee travel is formed between the cassettes of each pair of adjacent stacked supers, e.g. supers 120 and 120' of FIG. 13. The room 149 extends laterally through the full interior width and length of the adjacent supers and is accessible from the passages 146 and 147 of both supers. Each cassette bounding such room 149 has one of its bee entry slots 59 opening into such room 149. Thus, bees can travel vertically in the hive through the cassettes 40 and passages 145, 146 and 147 or any combination thereof as linked by the horizontally extending rooms 149.

The height of passages 146 and 147 and rooms 149, like spaces 145, is large enough to permit bee travel and is kept small enough (bees will not violate the classical Langstroth "bee space" of 1/4" to 3/8" and more exactly 9/32") so as not to induce bees to build burr comb therein, even despite transparency of cassette short sidewalls 47 at the top and bottom of the rooms 149. On the other hand, transparency of the cassette sidewalls provides visibility of bee activity in the spaces 145 and the room 149 between cassette cavities in supers 120 and 120' to promote uniform filling of such cavities.

In one device embodying the invention, the following dimensions were used:

In FIG. 10:
F = 4 35/64 inch
G = 4½ inch
H = 1/16 inch
J = 3/128 inch
In FIG. 5:
K = 43/64 inch
L = 41/64 inch
M = 1 5/16 inch
N = 9/32 inch
In FIG. 7:
P = 3/32 inch
E = 9/32 inch
Q = 15/16 inch
S = 3/32 inch
T = 1 11/32 inch
U = 3/32 inch
V = 1/32 inch
W = ½ inch
In FIG. 15A:
X = 1/16 inch
Y = 1/32 inch
In FIG. 13:
R = 9/32 inch
FF = 7/32 inch
GG = 1/16 inch
HH = about ½ inch
JJ = about 9/32 inch It will be understood that the above dimensions are merely illustrative and not limiting. It will further be understood that in manufacturing, dimensions may be varied to change the size of the apparatus or parts thereof and to provide the necessary clearances between relatively movable parts.

OPERATION

The operation of the apparatus will be understood from the foregoing description, but an example is summarized below for convenient reference.

Empty cassettes 40, with covers 44 oriented on bases 42 to open the bee entry slots 59 as in FIG. 3, are stacked vertically base upon cover to form upstanding columns C1, C2, etc. A super 120 is rotated through the angle AA (FIGS. 12 and 13) to an upstanding position with sidewalls 123 horizontal. Successive upstanding columns C1, C2, etc. can be seated atop a fixed follower board 128 (rightward follower board in FIGS. 12 and 13) previously inserted in the super against the spacers 134. Thereafter, the movable follower board 128 can be placed horizontally in the now upper portion of the super 120 and dropped atop the covers of the uppermost cassettes of the columns C1, C2, etc. Thereafter, the leaf springs 138 can be slid lengthwise, while compressively flexed, into their position between the movable follower board 128 and adjacent super sidewall 123 to compressively urge together the cassettes 40 of each of the columns C1, C2, etc. and to urge such columns against the fixed follower board 128 and spacers 134. Thereafter, the super 120 can be returned 90° back through the angle AA to its FIG. 13 position wherein the now horizontal pressure of the leaf springs 138 on the cassettes and interlocking ridges 81 and ledges 86 of the cassettes enables the follower boards 128 to fixedly locate the cassette stacks C1, C2, etc. vertically with respect to the open top and bottom of the super, as seen in FIG. 13.

After assembly of a hive from a plurality of stacked supers 120, and conventional hive base and roof elements not shown, bees are permitted to enter the hive through conventional hive entries not shown and move upwardly and downwardly from super to super through the passages 146 and 147 (FIG. 13), and horizontally through the horizontally open rooms 149 between cassette columns of adjacent supers, and vertically into and through the bee entry slots 59 which, as shown in FIG. 13, are preferably vertically aligned from super to super. Thus, bees have free access to each cassette to build comb on the foundation 51 thereof and to fill same with honey.

By maintaining the height of the bee passages throughout the hive as close as possible to the classical Langstroth bee space of about 5/16", as at HH, JJ and R in FIG. 13, required for movement of bees therealong, the tendency of the bees to build burr comb in such passages is reduced, even in the rooms 149 overlaid and underlaid by transparent cassette sidewalls 47, and despite the building of comb within the cassettes adjacent the sidewalls 47.

After being in the hive for a period of time, cassettes can be readily inspected to determine if they are filled.

More particularly, a quick visual inspection can be carried out on the hive merely by looking through the transparent sidewalls 47 of the various cassettes in a given super. A good idea of the extent of fill can be obtained without need to remove supers from the hive.

When desired, as when sufficiently filled with honey, the cassettes 40 can be removed from the super 120 substantially by reversing the steps of installation. More particularly, a super 120 is removed from the hive and rotated through the angle AA in FIG. 13 so that the cassette columns C1, C2, etc. are upstanding. Then, the springs 138 are removed from between the movable follower board 128 atop the cassette columns and the opposed super sidewall 123. The fixed (in this position lower) follower board 128 can be pulled, like a kind of tray, laterally out of the now rightwardly facing open top of the super while supporting thereon all of the upstanding cassette columns C1, C2, etc. and topped by the movable follower board 128. Upon removal of the latter, the cassettes in the individual columns can be unstacked. If some cassettes are unfinished, they can be accumulated and repacked easily (partial harvesting) or whole columns can be interchanged and the super replaced in the hive to encourage uniform filling, according to observed needs.

The cover 44 of each finished cassette can then be removed, rotated through 90°, and replaced upon the base 42 of such cassette, to place the cassette in its marketing configuration of FIG. 4, wherein the bee entry slots 59 are closed, and the cassette as a whole indeed is closed. Suitable labeling, if desired, can be applied to any desired outer surfaces of the cassette and the cover can be secured to the base, as by means of tape, adhesive labels, or any other convenient means, so as to inhibit opening of the cassette until the retail purchaser takes it home and is ready to use it. As stated, the cassettes in their FIG. 4 marketing configuration are readily stackable one atop the other in stacks made laterally stable by intermeshing of the ridges 81 with the ledges 86 and of the lugs 92 with the notches 91.

Several important features of the invention are summarized below.

Substantial advantages are obtained by constructing the cassettes of a combination of clear and opaque (or translucent) non-reflecting plastic. This is based on my discovery that comb construction on one side of a clear plastic wall appears to be influenced by the presence of comb or the activity of other bees on the other side of the clear plastic wall or by the reflective properties of the wall, while entirely different results are obtained when the cassette walls are of an opaque and non-reflective material. In the first instance, comb building tends to be conducted as though comb on each side of the substantially transparent wall is an extension of the other. Bees appear to observe the activity along the sides in adjacent cassettes and to build solid comb with full depth cells as though it were continuous through the clear plastic of the cassette sidewall. Reflective walls appear to give a similar result. Completion of the outside rows is a much-wanted result commercially. In opaque cassettes, comb building in the cassette is independent of activity in the next cassette. When the cassette is of opaque, non-reflective material, the bees tend to avoid drawing out the outside rows of cells.

However, the bees in one cassette, being able to "see through" the bottom of the neighbor cassette with its embossed or molded and foundation pattern, occasionally tend to try to draw a comb on the beneath bottom of that neighbor cassette. This results in an unwanted burr comb. Hence, constructing the section or cassette entirely of transparent material, as in FIG. 2, may be less than satisfactory. I have found that obstruction of visibility and reflection (as by frosting) on selected parts abovedescribed of the cassettes, in combination with clear plastic construction for the remainder of the cassette base and cover, results in a well-filled cassette of superior quality and at the same time avoids unwanted burr comb inside the cassette. Frosting of the cover top wall, at least on its underside, and if desired on its top side as well, along the outside perimeter thereof (leaving the center clear for the consumer to observe contents) further blocks the "view" of the edges of the bottom of the next cassette to further discourage "corner" burr construction.

The cassettes 40 advantageously incorporate means for stacking cassettes into horizontal columns which are self-supporting in a super, thus eliminating need for underlying wood slats which would block visual cues through cassette sides supported by such slats. In the embodiment shown, the ridge 81 and ledge 86 make a laterally extending columnar stack of cassettes self-supporting intermediate its ends and facilitates the support of the ends of the columnar stack within the super, given the compressive force of the springs 138.

The present invention advantageously extends the bee entry slots 59 to the full width of the cassette 40 while still permitting rotating the cover 44 from its FIG. 3 hive position to its FIG. 4 marketing position. With the cassette cover 44 in its honey-gathering position the coacting bevels at 68 and 72 (FIG. 9) prevent lateral displacement of the cover 44 with respect to the base 42 and eliminate the need for protrusions extending downward from the cover (or from an adjacent cassette bottom as in FIG. 2) into the upper portion of the base cavity and thereby further discourage "corner" burr, to thereby encourage fully filling the corners of the cassette base therebelow with honey comb.

Further, in the FIG. 3 hive position, the cover sidewalls 54 are flush with the exposed lower portions of the base sidewalls 48 of each cassette 40. Accordingly, the cassettes in adjacent columns of C1 and C2 (FIG. 12) abut in full area contact, without gaps therebetween, with adjacent columns C1 and C2 having covers 44 facing in the same direction to encourage building comb in the proper direction, and filling of such comb, by visual cues through the transparent sidewalls of side-by-side cassettes in adjacent columns. In my prior U.S. Pat. No. 4,435,865 it was necessary to alternate the direction of covers in adjacent columns so that the adjacent covered sections therein would fit snugly together without gaps therebetween, since the covered sections of the previous application had stepped sides. However, alternating the direction of adjacent columns of transparent cassettes would eliminate the favorable base-by-base alignment of neighboring cassettes and so cancel out the advantage of the "see through" phenomena at the sides of the cassettes. For example, if the cover 44 of a cassette 40 in column C1 faced the base of the adjacent cassette 40 in column C2, bees building comb from the bottom wall in the first cassette may through the adjacent transparent sidewalls induce bees in the adjacent second cassette to build comb from the cover toward the bottom wall, which is highly undesirable.

The modified FIGS. 16-19 embodiment is preferably similar to the abovedescribed FIGS. 3-15A embodiment except for differences described below. Parts in the modified FIGS. 16–18 embodiment corresponding to parts in the abovedescribed FIGS. 3–15A embodiment will be referred to by the same reference numerals with the suffix "Z" added.

Structure permitting the cover 44Z to be placed in "hive" (FIG. 16) and "marketing" (FIG. 17) alternative positions on the base 42Z is modified as follows. The ledges 76Z (FIGS. 17 and 18) are located higher on the opposed base sidewalls 48Z, level with the top edge 57Z of the adjacent sidewalls 47Z (i.e. the bottom of the bee entry slot 59Z of FIG. 16). The cover sidewalls 54Z (FIGS. 16 and 18) are thus vertically shorter and in the FIG. 17 "marketing" position are recessed in the bee entry slot 59Z to close same, rather than overlapping the adjacent base sidewall 47Z. The cover sidewall 54 is shorter in horizontal extent than the cover top wall 53Z and the base sidewalls 47Z and 48Z, so as to end at a distance from the corners of the cover top wall 53Z. As seen in FIG. 18, the ends of the cover sidewalls 54Z are beveled at 72Z and these beveled end surfaces 72Z each lie in a corresponding imaginary vertical plane (one being indicated by the dotted line 72ZZ) extending through the generally central portion (not necessarily the actual center) of the cover top wall 53Z. In other words, each beveled surface 72Z faces both inward toward the opposite sidewall 54Z and toward the immediately adjacent corner of the cover top wall 53Z. The bevels 72Z are thus angled approximately a quarter turn from the beveled surfaces 72 of the FIG. 6 embodiment.

In view of the modified end configuration 72Z of the cover sidewalls 54Z, the base 42 at each end of the base sidewall 48Z has an upper corner structure 201 separating the ends of the adjacent bee entry slot 59Z and recessed upper sidewall portion 66Z and carrying upstanding beveled surfaces 68Z and 68Z' terminating the ends of the adjacent recessed upper sidewall portion 66Z and the bee enrry slot 59Z. The beveled surfaces 68Z and 68Z', though not necessarily parallel, do face generally opposite each other. More particularly, the beveled surface 68Z faces angularly outward from the base and toward the opposite end of the corresponding recessed upper sidewall portion 66Z. The beveled surface 68Z' faces angularly outward of the cassette base and toward the opposite end of the corresponding bee entry slot 59Z. The angle of the base beveled surfaces 68Z and 68Z' match that of the cover sidewalls end surfaces 72Z so that the cover beveled surfaces 72Z rest close to and substantially parallel with the base beveled surfaces 68Z and 68Z' respectively in the FIG. 16 and FIG. 17 cover positions on the base.

Advantages of this modified structure are as follows. The cover sidewalls are shallower, thicker and recessed in the base sidewalls (and thus protected from breakage e.g. by the apiarist's scraping tool when cleaning cassettes). Also, the "marketing" position overlap of cover and base sidewall is eliminated, the sidewalls of the base and cover being flush both in the "hive" and "marketing" positions, for more compact packing and shipping cartons, for greater stability when displayed on edge and to provide broader flat surfaces to carry labels. Also, recessing of the ends of the cover sidewalls reduces the amount of cracks in the cassette accessible to bees and hence reduces "crack" cues tending to induce construction of burr comb.

Figure 16:
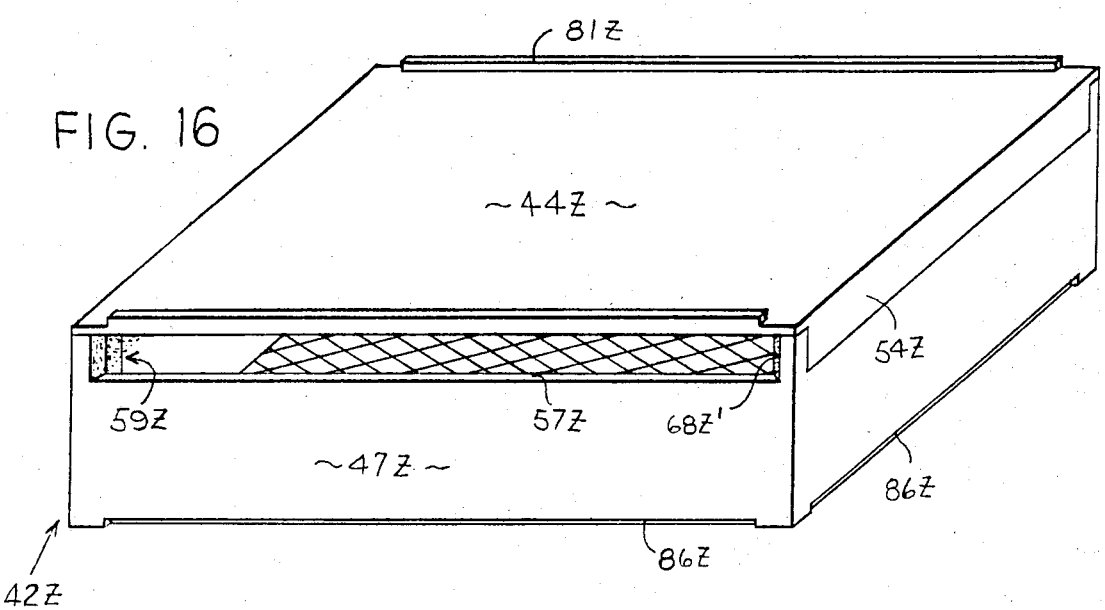
FIG. 16 is a view similar to FIG. 3 but showing a modification.
Figure 17:
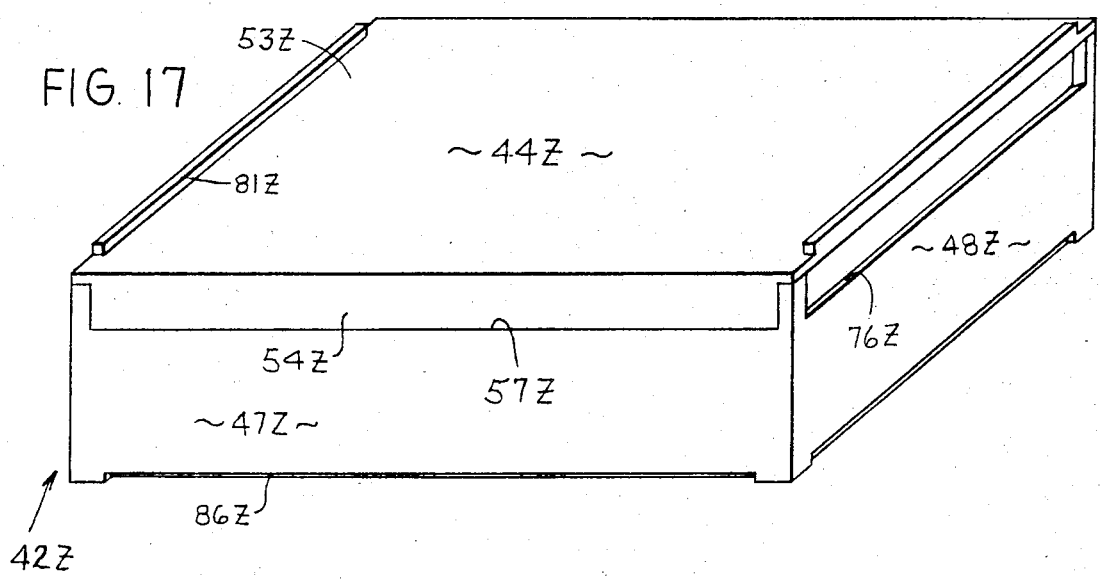
FIG. 17 is a view similar to FIG. 4 but showing the FIG. 16 modification.
Figure 18:
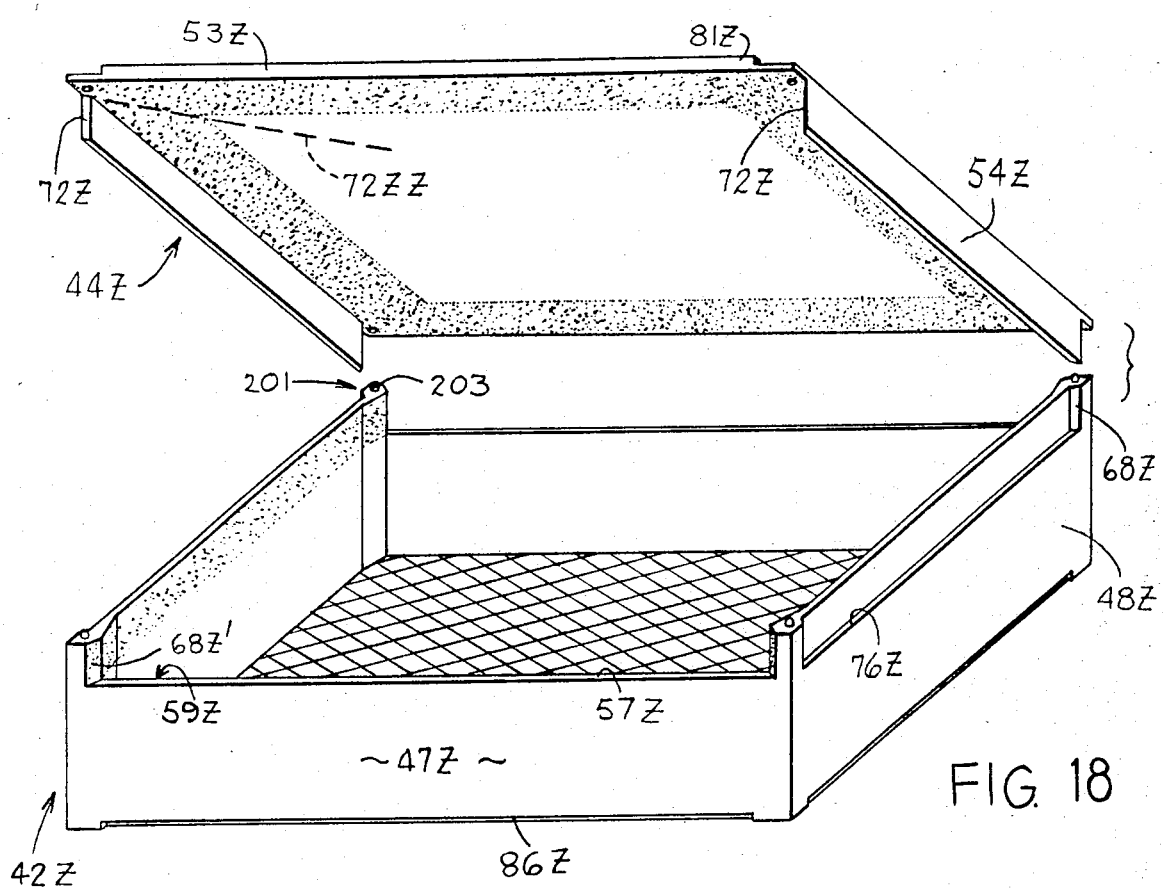
FIG. 18 is an oblique view similar to FIG. 16 but exploded to show interior surfaces of the cover and base.

As seen in FIGS. 16–18, the ridges 81Z and ledges 86Z need not run the entire length of the corresponding cassette cover and base side edges but may instead end a short distance from the corners of the cassette. In this way, the ends of the ridges 81Z of the cover of one cassette will be recessed in and protected by the ends of the corresponding sidewall 47Z or 48Z of the base of a cassette stacked thereatop.

The cover top wall 53Z in FIGS. 16–19 is made flat, rendering it more easily cleanable. The visual cues provided by cassette base construction below the bee entry slot and elimination of visual cues above the height of the bee entry slot on the base sidewalls 48Z are relied on to induce comb building and filling up to the height of the bee entry slot and not above, so as to provide a substantially level filled comb in the cassette.

Figure 19:
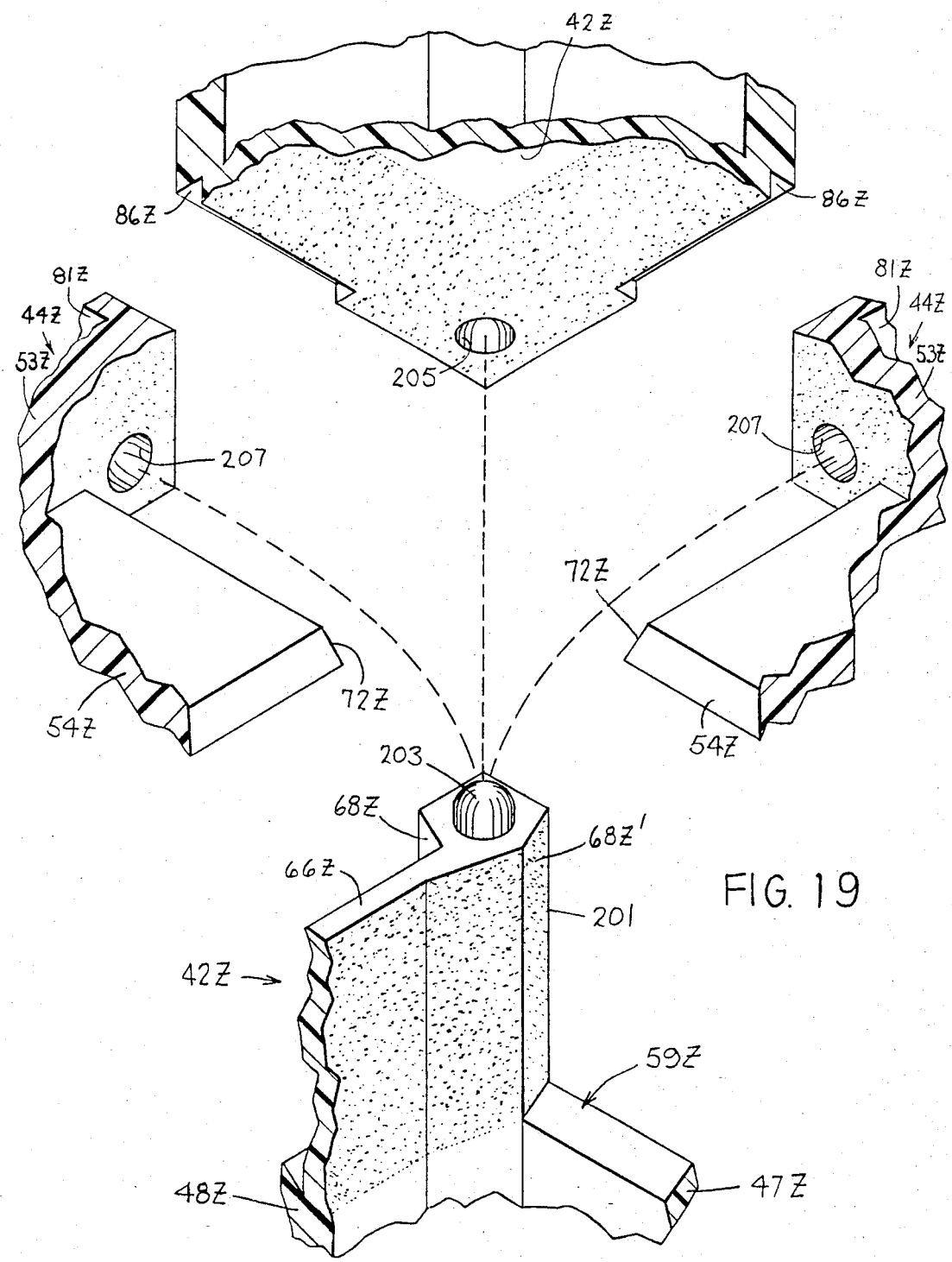
FIG. 19 is an enlarged, fragmentary, exploded perspective view of the FIG. 18 rear left corner of the modified cassette base and, for alternate emplacement thereon, and reading from left to right, (a) a cover oriented for placement on the base in the FIG. 16 "hive" position, (b) the bottom of an adjacent cassette placeable bottom-to-top thereon in the manner of FIG. 2A, and (c) a cover oriented for placement thereon in the FIG. 17 "marketing" position.

As indicated in FIG. 19, the cassette bases 42Z may, as an alternative, be stacked top-to-bottom (like FIG. 2A bases or sections 20A, 20B) to form columns analogous to those at C1, C2 in FIG. 2, and without their covers 44Z. The beekeeper is given a particularly advantageous flexibility if, using the same type of cassette, he can alternately, as desired, make columnar stacks in the hive of cassette bases only (arranged top-to-bottom as in FIG. 2A) or complete cassettes (covers and bases) as in FIG. 12. It is further desirable to provide such flexibility without generating further cracks or corners to cue bees to build burr comb (to avoid the protrusions 33 of FIG. 2A for example). In the preferred arrangement shown in FIGS. 18 and 19, such is accomplished by providing upstanding posts 203 fixed atop each of the four corners 201 of a cassette base 42Z for snug but releasable insertion in corresponding downward facing holes 205 in the bottom surface of the bottom wall 46Z of an opposed cassette base 42Z, adjacent the corners thereof. The posts 203 and holes 205 are aligned vertically in each cassette base so that cassette bases can be stacked with bottom of one atop the top of the next in an aligned columnar stack. The top of post 203 is preferably rounded or tapered to facilitate insertion into a corresponding hole 205. To prevent the post 203 from interfering with positioning of a cover 44Z in either its "hive" or "marketing" position on the cassette base 42Z, the cassette cover 44Z has similar holes 207 adjacent the corners of the bottom face of the top wall 53Z thereof arranged in aligned relation to receive the post 203 therein with the cover in its FIG. 16 and FIG. 17 positions on the base. Also, snug registration of the posts 203 in the holes 207 in the cover helps frictionally hold the cover from lifting off the base when separating cassettes from a column and assists in lateral location of the cover on the base. Further, a columnar stack of cassette bases 42Z with its holes 205 and posts 203 and without interposed covers, may be located with a single cover 44Z on the base 42Z whose top faces one of the follower boards 128 of FIG. 12, to positively locate thereon the end of the columnar stack of such cassette bases.

The modified FIGS. 16–19 embodiment also permits the beekeeper the further alternative of use of entire (covered) cassettes in the hive with covers that are not marketed with the filled cassette base but rather are removed and replaced with clean covers for marketing, the used covers being applied to new cassette bases for filling with honey in the next cycle of hive operation. In this way, if minor amounts of burr comb accumulate on the covers in the hive, any risk of that burr comb detracting from the marketing appearance of the cassette can be avoided. However, with the above disclosed embodiments of the invention, it is not likely that this capability will be needed, since the risk of significant burr comb accumulation has been substantially reduced and ease of cleaning has been enhanced.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for producing comb honey in a hive, the combination comprising:
   a super having opposed sides;
   a plurality of similar honey cassettes stacked top to bottom to form a column extending between said sides of said super;
   means operatively associated with said column of cassettes and said super for pressing together said cassettes axially of said column;
   connecting means between each adjacent pair of cassettes and between endmost cassettes and the opposed sides of said super for positively blocking dropping of a given cassette from said column toward the bottom of said super and for resisting bending of the middle of said column down toward the bottom of said super, the middle of said column being free of direct contact with or support by said super.

2. The apparatus of claim 1 in which said pressing means comprises spring means compressed axially of said column, said means for positively blocking comprising vertically overlapping parts of each adjacent pair of cassettes, said opposed sides of said super being fixed with respect to each other to enable each spring means to maintain said vertical overlapping of said parts of said cassettes in said column.

3. The apparatus of claim 1 in which said stacked cassettes are open topped boxlike sections each having sidewalls and a bottom wall, said sections being stacked with the open top of one against the bottom wall of the next in said column, said connecting means being means overlapping in the direction of the column and carried at the top of one section and the adjacent bottom of the next section for positively blocking relative movement of the two adjacent sections in a direction transverse of said column.

4. In a device for producing comb honey in a hive, the combination comprising:
   a super having opposed sides;
   a plurality of similar honey cassettes stacked top to bottom to form a column extending between said sides of said super;
   means operatively associated with said column of cassettes and said super for pressing together said cassettes axially of said column;
   connecting means between each adjacent pair of cassettes and between endmost cassettes and the opposed sides of said super for positively blocking dropping of a given cassette from said column toward the bottom of said super and for resisting bending of the middle of said column down toward the bottom of said super, the middle of said column being free of direct contact with or support by said super, in which said connecting means comprise an opposed pair of ledges on one cassette engaged by an opposed pair of ridges on the adjacent cassette, one ridge and interengaged ledge being adjacent the open bottom of said super and the other opposed ridge and interengaged ledge being adjacent the top of said super.

5. The apparatus of claim 4 in which a given said cassette comprises a boxlike base having an open top and closed bottom and a cover releasably fixed on the open top of said base, said cassettes being arrranged in said column with the cover of one pressed against the bottom of the base of the next, said ridges being carried by one of said cover and base bottom, said ledges being carried by the other.

6. In a device for producing comb honey in a hive, the combination comprising:
   a super having opposed sides;
   a plurality of similar honey cassettes stacked top to bottom to form a column extending between said sides of said super;
   means operatively associated with said column of cassettes and said super for pressing together said cassettes axially of said column;
   connecting means between each adjacent pair of cassettes and between endmost cassettes and the opposed sides of said super for positively blocking dropping of a given cassette from said column toward the bottom of said super and for resisting bending of the middle of said column down toward the bottom of said super, the middle of said column being free of direct contact with or support by said super, in which said connecting means further includes first and second follower panels removably disposed in said super adjacent respective said sides of said super, said pressing means comprising spring means interposed between one said side of said super and said first follower panel for pressing the column between said follower panels, one end cassette of the column having a ridge supported by one said follower panel and ledge means on the other follower board supporting the other end cassette of said column for preventing said column from falling down toward the bottom of said super, said follower boards and column being removable as a unit from the super through the top of the super.

7. A cassette for production and marketing of comb honey, comprising:
   a boxlike base having a bottom wall and upstanding sidewalls defining an upward opening cavity, said bottom wall including means defining a foundation for formation of comb honey in said cavity;
   a cover having a top wall and an opposed pair of sidewalls, said cover being mountable on the open top end of said base in a first position to allow bee access to the cavity and being alternatively mountable on said base in a second position angled with respect to said first position for precluding the entry into said cavity, the sidewalls of said cover engaging an opposed pair of first sidewalls of said base in said first position and engaging an opposed pair of second sidewalls of said base in said second position;
   said second sidewalls of said base being less tall than said first sidewalls of said base for defining a bee entry over the top of said less tall pair of base sidewalls with said cover in said first position, said bee entry extending substantially the full distance between said first sidewalls of said base;
   said base and cover being provided with interactive means permitting placement and removal of said cover on said base but precluding sliding of said cover with respect to said base in a direction parallel to the bottom wall of said base.

8. The apparatus of claim 7 in which said interactive means comprise outward facing beveled surfaces on or near the upper portion of the four corners of said base and correspondingly angled, inward facing beveled surfaces on the ends of said sidewalls of said cover and thus at each corner of said cover, said beveled surfaces on said cover facing said beveled surfaces on said base and snugly but slidably bearing thereagainst with the cover in place on said base, said beveled surfaces on said cover and base being oriented to permit said cover to be slid off and on the top of said base but preventing movement of said cover in directions parallel to the bottom of said base.

9. The apparatus of claim 8 in which said beveled surfaces are angled at an acute angle to the sidewalls of said base and cover, said beveled surfaces being identically located with respect to corners of a square to permit placement of said cover on said base at two alternate positions, one of which is rotated 90° from the other.

10. A cassette array for production of comb honey in a hive, comprising:
first and second cassettes disposed in said super, said cassettes each having a base including sidewalls upstanding from a foundation wall to define a cavity opening at the top thereof, said cassettes including an entrance means adjacent the tops thereof for admitting bees to the cavities thereof for building comb and storing honey therein;
said first and second cassettes being located side by side in the super with the sidewall of the first cassette adjacent and facing the sidewall of the second cassette;
each of said adjacent facing sidewalls of said first and second cassette bases having means for inducing bees to build comb and store honey snugly against said sidewalls from said foundation wall up to about the bottom of said entrance means, such inducing means comprising portions of said sidewalls constructed of material capable of providing visual cues to bees within said cassette, by at least one of (1) transmission through, and (2) reflection from said sidewalls, of electromagnetic radiation sensible by bees, said cassette base sidewall portions material being a smooth clear transparent material, and said sidewall portions extending from said foundation wall up to about the bottom of said bee entrance means, at least two of said sidewalls having top portions above the level of the bottoms of the entrance means, which top portions are of material for substantially blocking (1) transmission through and (2) reflection from same of electromagnetic radiation sensible by bees.

11. A cassette array for production of comb honey in a hive, comprising:
first and second cassettes, said cassettes each having a base including sidewalls to define a cavity opening at least at the top thereof, said casettes including means for admitting bees to the cavities thereof for building comb and storing honey therein;
said first and second cassettes being located side by side with the sidewall of the first cassette adjacent and facing the sidewall of the second cassette;
said sidewalls of said cassette base having means for inducing bees to build comb and store honey to a preselected depth thereagainst, such means being provided by constructing portions of said sidewalls of material capable of providing visual cues to bees within said cassette, by at least one of (1) transmission through, and (2) reflection from, said sidewalls, of electromagnetic radiation sensible by bees, in which said cassettes each have a bottom from which said sidewalls are upstanding, and in which a said cassette includes a cover on the top thereof and interposed between the base thereof and the base of another cassette stacked thereon to form a column, said cover having a top, the perimeter portion of the top being non-transparent and non-reflective to block visual cues to bees therein while in the hive, the center portion of said cover being transparent to permit human viewing of the contents of the cassette outside the hive.

12. The apparatus of claim 11 including non-transparent means interposed between the cavities of two side by side cassettes for reducing visibility from one said cavity to the other and thereby for reducing the tendency of bees to build comb downward from the top of a given cassette toward the bottom thereof.

13. The apparatus of claim 11 in which said portions of said sidewalls are substantially transparent to provide said visual cues to bees by transmission.

14. The apparatus of claim 11 in which said portions of said sidewalls have a shiny smooth finish on the inside thereof and including means tending to cause said portions of said sidewalls to reflect electromagnetic radiation from within the cassette base back thereinto.

15. A cassette array for production of comb honey in a hive, comprising:
first and second cassettes, said cassettes each having a base including sidewalls to define a cavity opening at least at the top thereof, said cassettes including means for admitting bees to the cavitites thereof for building comb and storing honey therein;
said first and second cassettes being located side by side with the sidewall of the first cassette adjacent and facing the sidewall of the second cassette;
said sidewalls of said cassette base having means for inducing bees to build comb and store honey to a preselected depth thereagainst, such means being provided by constructing portions of said sidewalls of material capable of providing visual cues to bees within said cassette, by at least one of (1) transmission through, and (2) reflection from, said sidewalls, of electromagnetic radiation sensible by bees, in which said cassettes each have a bottom from which said sidewalls are upstanding, and in which the bottom of said cassette base defines a foundation wall facing into said cavity and having means for inducing bees to build comb thereon within said cavity, the peripheral part of said bottom being at least one of (1) non-transparent and (2) nonreflective so as to reduce visual comb building cues to bees therefrom, said cassettes being stackable with the bottom of one adjacent the top of the next, such that bees tend to build comb and fill same with honey at a substantially constant depth from one side of the next cassette cavity to the other and reaching upward from the foundation wall thereof but do not tend to build comb downward from the top peripheral portion of the next cassette toward the foundation wall thereof, the central portion of said bottom being substantially transparent to allow a human buyer to view cassette contents from the underside of the cassette, said stacked cassettes each including an opening near the top thereof for permitting entry and exit of bees into the cavity therewithin.

16. The apparatus of claim 15 including non-transparent means interposed between the cavities of two side by side cassettes for reducing visibility from one said cavity to the other and thereby for reducing the tendency of bees to buid comb downward from the top of a given cassette toward the bottom thereof.

17. The apparatus of claim 15 in which said portions of said sidewalls are substantially transparent to provide said visual cues to bees by transmission.

18. The apparatus of claim 15 in which said portions of said sidewalls have a shiny smooth finish on the inside thereof and including means tending to cause said portions of said sidewalls to reflect electromagnetic radiation from within the cassette base back thereinto.

19. Apparatus for production of comb honey therein by bees, comprising:
a comb honey cassette base having a bottom wall and sidewalls extending from said bottom wall to define a cavity open at the top thereof, said bottom wall having foundation means for inducing bees to build comb within said cavity on said bottom wall, an opening through one of said sidewalls near the top thereof defining a bee entry-exit slot for permitting entry and exit of bees into the cavity, said sidewalls below the level of said bee entry slot being of smooth transparent material permitting visual cueing of bees within the cavity, due to at least one of (1) reflections from and (2) transmission through, said sidewalls having means at levels between the bee entry slot and top edge thereof rendering same non-transparent and non-reflective to avoid cueing bees to build comb above the level of said bee entry slots.

20. The apparatus of claim 19 in which said cassette includes a cover removably located atop said base, said cover having means engageable with the top of said base to position said cover positively on said base, said cover having a top wall of smooth and transparent material in the central portion thereof and having a non-transparent and non-reflective peripheral portion covering the peripheral portion of said cavity for discouraging bees from building comb in the upper peripheral portions of said cavity.

21. A cassette for production of comb honey therein, comprising:
a base having a bottom and sidewalls upstanding from said bottom to define a cavity open through the top of said cassette;
a cover removably fixed on the open top of said base, said cover having an opposed pair of sidewalls at least partially overlapping the upper portion of a pair of sidewalls of said base, the last-mentioned pair of sidewalls of said base being provided on their outer surfaces with upward facing ledges, such that the upper portions of said last-mentioned sidewalls of said base are stepped laterally inward with respect to the bottom portions thereof for said overlapping by said opposed pair of sidewalls of said cover, such that the outer surfaces of said sidewalls of said cover and the lower portions of said last-mentioned sidewalls of said base are flush when the cover is so installed on said base, whereby to permit two columns of cassettes each formed by stacking cassettes top to bottom to be side-by-side abutted without creating significant spaces between the two columns.

* * * * *